US012771812B2

(12) United States Patent
Dasilva et al.

(10) Patent No.: US 12,771,812 B2
(45) Date of Patent: Oct. 20, 2026

(54) CAPTURING IMAGES FOR A SPHERICAL VENUE

(71) Applicant: Sphere Entertainment Group, LLC, New York, NY (US)

(72) Inventors: Deanan Dasilva, Malibu, CA (US); Michael Graae, Brooklyn, NY (US)

(73) Assignee: Sphere Entertainment Group, LLC, New York, NY (US)

(*) Notice: Subject to any disclaimer, the term of this patent is extended or adjusted under 35 U.S.C. 154(b) by 0 days.

(21) Appl. No.: 18/332,855

(22) Filed: Jun. 12, 2023

(65) Prior Publication Data

US 2024/0214676 A1 Jun. 27, 2024

Related U.S. Application Data

(60) Provisional application No. 63/434,309, filed on Dec. 21, 2022.

(51) Int. Cl.
*H04N 5/335* (2011.01)
*H04N 9/31* (2006.01)
(Continued)

(52) U.S. Cl.
CPC ......... *H04N 9/3105* (2013.01); *H04N 9/3188* (2013.01); *H04N 9/646* (2013.01);
(Continued)

(58) Field of Classification Search
CPC ...................................................... G02B 13/06
See application file for complete search history.

(56) References Cited

U.S. PATENT DOCUMENTS 3,971,065 A * 7/1976 Bayer .................. H04N 25/133 348/E9.003
5,900,982 A 5/1999 Dolgoff et al.
(Continued)

FOREIGN PATENT DOCUMENTS

JP 2002026304 A * 1/2002
JP 2003219226 A 7/2003
KR 20200045176 A 5/2020

OTHER PUBLICATIONS

Non-Final Office Action for U.S. Appl. No. 18/349,323, dated Jun. 12, 2025 pp. 1-16 (Year: 2025).*
(Continued)

*Primary Examiner* — Gary C Vieaux
(74) *Attorney, Agent, or Firm* — Sterne, Kessler, Goldstein & Fox P.L.L.C.

(57) ABSTRACT

Systems, methods, and apparatuses disclosed herein can include an exemplary image capture system to capture light that is related to an image within its field of view and/or an exemplary image projection system to transform the image for projection onto a three-dimensional media plane of a three-dimensional venue. The exemplary image capture system can direct rays of light that were captured by the exemplary image capture system onto an image sensor that is associated with the exemplary image capture system. As to be described in further detail below, the exemplary image capture system can focus these rays of light toward a periphery, or edge, of the image sensor. As a result, the three-dimensional venue can display the highest optical image quality for the image toward a bottom, or a springing, of the three-dimensional media plane. Moreover, the exemplary image capture system can be specifically manufactured to heterogeneously, for example, non-uniformly, distribute the rays of light that were captured by the exemplary image capture system onto the image sensor to further enhance the (Continued)

highest optical image quality for the image. As to be described in further detail below, the exemplary image projection system can project the image onto the three-dimensional media plane of the three-dimensional venue. As part of this projecting, the exemplary image projection system can mathematically transform two-dimensional coordinates of pixels of the image onto three-dimensional coordinates of the three-dimensional media plane to project the image onto the three-dimensional media plane. And as part of this projecting, the exemplary image projection system can statistically interpolate color information that is to be projected onto the three-dimensional media plane from the image.

28 Claims, 13 Drawing Sheets

(51) Int. Cl.
*H04N 9/64* (2023.01)
*H04N 9/77* (2006.01)
*H04N 23/12* (2023.01)
*H04N 23/67* (2023.01)
*H04N 23/695* (2023.01)
*H04N 23/698* (2023.01)
*H04N 23/84* (2023.01)
*G02B 13/06* (2006.01)

(52) U.S. Cl.
CPC ............... *H04N 9/77* (2013.01); *H04N 23/12* (2023.01); *H04N 23/671* (2023.01); *H04N 23/695* (2023.01); *H04N 23/698* (2023.01); *H04N 23/843* (2023.01); *G02B 13/06* (2013.01)

(56) References Cited

U.S. PATENT DOCUMENTS 6,330,002 B1 12/2001 Yamada
6,489,956 B1 12/2002 Deering
6,496,187 B1 12/2002 Deering et al.
6,664,955 B1 12/2003 Deering
6,669,346 B2 12/2003 Metcalf
6,727,971 B2 4/2004 Lucas
6,811,264 B2 11/2004 Raskar et al.
6,937,210 B1 8/2005 Macdonald
7,106,411 B2 9/2006 Read et al.
7,224,392 B2 * 5/2007 Cahill .................... H04N 23/54 348/340
7,317,473 B2 1/2008 Chen et al.
7,339,596 B2 3/2008 Tajima
7,382,399 B1 6/2008 McCall et al.
7,515,747 B2 4/2009 Okutomi et al.
8,210,686 B2 7/2012 DePaor
8,350,846 B2 1/2013 Mejdrich et al.
8,358,317 B2 1/2013 Carlson
8,646,918 B2 * 2/2014 De Paor ................. G03B 37/04 353/62
8,896,601 B1 11/2014 Norman
8,902,335 B2 12/2014 Doepke et al.
9,020,551 B2 4/2015 Kubota
9,298,008 B2 3/2016 Algreatly
9,495,936 B1 11/2016 Norquist
9,503,711 B2 11/2016 Iversen et al.
9,582,731 B1 2/2017 Butko et al.
9,791,768 B2 10/2017 Korenev et al.
9,792,709 B1 10/2017 Meler
9,817,627 B2 11/2017 Kreiner et al.
9,858,663 B2 1/2018 Penney et al.
10,025,549 B1 7/2018 Welck
10,044,932 B2 8/2018 Martin
10,200,596 B1 * 2/2019 Silverstein ........... G02B 27/646
10,419,716 B1 9/2019 Tanumihardja et al.
10,419,738 B1 9/2019 Phillips et al.
10,573,060 B1 2/2020 Ascolese et al.
10,600,152 B1 3/2020 Fontvielle et al.
10,614,553 B1 4/2020 Wang et al.
10,685,478 B1 6/2020 Laurino
10,715,783 B1 7/2020 Joshi
10,740,957 B1 8/2020 McElroy et al.
10,754,242 B2 8/2020 Kim et al.
10,810,789 B2 10/2020 Kim et al.
10,848,723 B2 * 11/2020 Liu ........................ G03B 37/04
10,855,965 B1 12/2020 Jiao et al.
10,861,213 B1 12/2020 Holzer et al.
10,893,218 B1 1/2021 Douady et al.
10,924,747 B2 2/2021 Kim et al.
10,958,950 B2 3/2021 Dore et al.
10,991,068 B2 4/2021 Zhu et al.
10,999,527 B1 5/2021 Guerin
11,138,800 B1 * 10/2021 Seiler ...................... G06T 15/08
11,185,774 B1 11/2021 Goldstein
11,228,776 B1 1/2022 Choi et al.
11,259,046 B2 2/2022 Kim et al.
11,272,160 B2 3/2022 Li et al.
11,375,165 B2 6/2022 Boud et al.
11,676,328 B1 6/2023 Baize et al.
11,832,145 B2 11/2023 Dumas
11,936,844 B1 3/2024 Zhang et al.
11,962,946 B2 4/2024 Ishii
12,058,510 B2 8/2024 Elby et al.
12,086,301 B2 9/2024 Spears et al.
12,094,074 B2 9/2024 Hitchcock et al.
12,143,559 B2 11/2024 Ragan et al.
12,148,122 B2 11/2024 Yang et al.
12,160,964 B2 12/2024 Luthwaite et al.
12,200,185 B1 1/2025 Bacim De Araujo E Silva et al.
12,244,886 B2 3/2025 Rodriguez et al.
12,469,214 B2 11/2025 Ward et al.
2001/0028352 A1 10/2001 Naegle et al.
2001/0055025 A1 12/2001 Deering et al.
2002/0000988 A1 1/2002 Nelson et al.
2002/0005854 A1 1/2002 Deering et al.
2002/0008697 A1 1/2002 Deering
2002/0009699 A1 1/2002 Hyodo et al.
2002/0012004 A1 1/2002 Deering
2002/0015052 A1 2/2002 Deering
2002/0033828 A1 3/2002 Deering et al.
2002/0070944 A1 6/2002 Deering
2002/0101417 A1 8/2002 Burk et al.
2002/0113787 A1 8/2002 Ray et al.
2002/0122044 A1 9/2002 Deering
2002/0158856 A1 10/2002 Deering et al.
2002/0196538 A1 12/2002 Lantz et al.
2003/0011535 A1 1/2003 Kikuchi et al.
2003/0011609 A1 1/2003 Deering et al.
2003/0016218 A1 1/2003 Zwicker et al.
2003/0034992 A1 2/2003 Brown Elliott et al.
2003/0063816 A1 4/2003 Chen et al.
2003/0076331 A1 4/2003 Deering
2003/0085906 A1 5/2003 Elliott et al.
2003/0103058 A1 6/2003 Hellen Brown Elliott et al.
2003/0160789 A1 8/2003 Tang et al.
2003/0206179 A1 11/2003 Deering
2004/0017608 A1 1/2004 Lantz
2004/0114047 A1 6/2004 Vora et al.
2004/0184010 A1 9/2004 Raskar et al.
2004/0207819 A1 10/2004 Moriwaki et al.
2005/0007775 A1 1/2005 Belliveau
2005/0083405 A1 4/2005 Imoto et al.
2005/0190082 A1 * 9/2005 Kumata .................... B60R 1/25 348/148
2005/0190346 A1 9/2005 Belliveau
2005/0264879 A1 * 12/2005 Deter ................... G02B 26/125 359/451
2007/0033289 A1 2/2007 Nuyttens et al.
2007/0035656 A1 * 2/2007 Inaba ....................... G03B 5/06 348/E5.078
2007/0216782 A1 * 9/2007 Chernoff ................ H04N 5/772 386/E5.072
2008/0100697 A1 5/2008 Baker

(56) References Cited

U.S. PATENT DOCUMENTS

2008/0204666 A1 8/2008 Spearman
2008/0298708 A1 12/2008 Ovsiannikov et al.
2008/0309815 A1* 12/2008 Nanjo .................... G02B 13/00 348/E5.042
2009/0049452 A1 2/2009 Kriegel et al.
2009/0059096 A1 3/2009 Yamamoto et al.
2009/0201595 A1* 8/2009 Matsumoto ............ G02B 7/023 359/822
2009/0219381 A1 9/2009 Ayala
2009/0244267 A1 10/2009 Yuan et al.
2009/0322740 A1 12/2009 Carlson
2010/0001997 A1 1/2010 Kajikawa et al.
2010/0033682 A1 2/2010 LaDuke et al.
2010/0110069 A1 5/2010 Yuan
2010/0300006 A1 12/2010 Magpuri
2011/0069237 A1 3/2011 Wang et al.
2011/0229106 A1 9/2011 Cho
2011/0304687 A1 12/2011 Joshi et al.
2012/0105702 A1 5/2012 Kogure
2012/0250937 A1 10/2012 Corcoran et al.
2012/0320427 A1 12/2012 Zheng et al.
2013/0044108 A1 2/2013 Tanaka et al.
2013/0104182 A1 4/2013 Zhang et al.
2013/0253979 A1 9/2013 Williams et al.
2014/0016100 A1 1/2014 Kim et al.
2014/0071227 A1 3/2014 Takenaka et al.
2014/0085192 A1 3/2014 Posa et al.
2014/0176917 A1 6/2014 Tanaka
2014/0184742 A1 7/2014 Kamp et al.
2014/0226008 A1* 8/2014 Lang ......................... B60R 1/25 348/148
2014/0278131 A1 9/2014 Amir et al.
2015/0022869 A1 1/2015 Shi et al.
2015/0062154 A1 3/2015 Ellis et al.
2015/0109648 A1 4/2015 Uchiyama
2015/0163447 A1* 6/2015 Kim .......................... G06T 3/08 348/745
2015/0189248 A1 7/2015 Shin
2015/0249815 A1 9/2015 Sandrew et al.
2015/0348316 A1 12/2015 Porcino et al.
2015/0358612 A1 12/2015 Sandrew et al.
2015/0358613 A1 12/2015 Sandrew et al.
2016/0005435 A1 1/2016 Campbell et al.
2016/0028997 A1 1/2016 Kanai et al.
2016/0034240 A1 2/2016 Kreiner et al.
2016/0080710 A1 3/2016 Hattingh et al.
2016/0086379 A1 3/2016 Sadi et al.
2016/0112489 A1 4/2016 Adams et al.
2016/0127723 A1 5/2016 Kim et al.
2016/0142692 A1 5/2016 Kim et al.
2016/0188992 A1 6/2016 Hiraga et al.
2016/0191815 A1 6/2016 Annau et al.
2016/0205341 A1 7/2016 Hollander et al.
2016/0232827 A1 8/2016 Chen et al.
2016/0277772 A1 9/2016 Campbell et al.
2016/0300323 A1 10/2016 Nakagawa et al.
2016/0353089 A1 12/2016 Gallup et al.
2016/0381267 A1* 12/2016 Waldron .............. G01C 21/025 348/169
2017/0064295 A1 3/2017 Stolzberg et al.
2017/0134731 A1 5/2017 Tourapis et al.
2017/0244775 A1 8/2017 Ha et al.
2017/0251208 A1 8/2017 Adsumilli et al.
2017/0293998 A1 10/2017 Kim et al.
2017/0295356 A1 10/2017 Abbas et al.
2017/0302714 A1 10/2017 Ramsay et al.
2017/0330337 A1 11/2017 Mizutani
2017/0339440 A1 11/2017 Galpin et al.
2018/0007387 A1 1/2018 Izumi
2018/0007389 A1 1/2018 Izumi
2018/0020202 A1 1/2018 Xu et al.
2018/0020238 A1 1/2018 Liu et al.
2018/0020248 A1 1/2018 Lai et al.
2018/0027226 A1 1/2018 Abbas et al.
2018/0035172 A1 2/2018 Lai et al.
2018/0039856 A1 2/2018 Hara
2018/0048877 A1 2/2018 Lai et al.
2018/0054613 A1 2/2018 Lin et al.
2018/0061002 A1 3/2018 Lee et al.
2018/0063505 A1 3/2018 Lee et al.
2018/0109772 A1 4/2018 Xu et al.
2018/0109810 A1 4/2018 Xu et al.
2018/0113997 A1 4/2018 Tanigawa et al.
2018/0114348 A1 4/2018 Lu et al.
2018/0122042 A1 5/2018 Kim et al.
2018/0131920 A1 5/2018 Kim et al.
2018/0144488 A1 5/2018 Kim et al.
2018/0146138 A1 5/2018 Jeon et al.
2018/0165830 A1 6/2018 Danieau et al.
2018/0165886 A1 6/2018 Lin et al.
2018/0167555 A1 6/2018 Li et al.
2018/0167596 A1 6/2018 Buffin
2018/0184121 A1 6/2018 Kim et al.
2018/0199029 A1 7/2018 Van Der Auwera et al.
2018/0199042 A1 7/2018 Wang et al.
2018/0205934 A1 7/2018 Abbas et al.
2018/0211443 A1 7/2018 Abbas
2018/0227484 A1 8/2018 Hung et al.
2018/0240223 A1 8/2018 Yi et al.
2018/0276788 A1 9/2018 Lee et al.
2018/0276789 A1 9/2018 Van Der Auwera et al.
2018/0276826 A1 9/2018 Van Der Auwera et al.
2018/0322611 A1 11/2018 Bang et al.
2018/0322688 A1 11/2018 Ozguner et al.
2018/0332265 A1 11/2018 Hwang et al.
2018/0338160 A1 11/2018 Lee et al.
2018/0350134 A1 12/2018 Lodato et al.
2018/0359459 A1 12/2018 Lee et al.
2018/0374192 A1 12/2018 Kunkel et al.
2019/0026934 A1 1/2019 Shih et al.
2019/0028642 A1 1/2019 Fujita et al.
2019/0051037 A1 2/2019 Chui et al.
2019/0052836 A1 2/2019 Kawasumi
2019/0058862 A1 2/2019 Kim et al.
2019/0088001 A1 3/2019 Lin et al.
2019/0089943 A1 3/2019 Yun et al.
2019/0108611 A1 4/2019 Izumi
2019/0121515 A1 4/2019 Nashida
2019/0132576 A1 5/2019 Zhang et al.
2019/0139296 A1 5/2019 Lakshman et al.
2019/0158809 A1 5/2019 Sasaki
2019/0182462 A1 6/2019 Abbas et al.
2019/0208216 A1 7/2019 Yamori et al.
2019/0230142 A1 7/2019 He et al.
2019/0230377 A1 7/2019 Ma et al.
2019/0238609 A1 8/2019 Skupin et al.
2019/0238861 A1 8/2019 D'Acunto et al.
2019/0268608 A1 8/2019 Ma et al.
2019/0270118 A1 9/2019 Araujo-Simon
2019/0273936 A1 9/2019 Ma et al.
2019/0289327 A1 9/2019 Lin et al.
2019/0318452 A1 10/2019 Oh et al.
2019/0325553 A1 10/2019 Lin et al.
2019/0335203 A1 10/2019 Li et al.
2019/0342577 A1 11/2019 Alshina et al.
2019/0342578 A1 11/2019 Lee
2019/0356899 A1 11/2019 Oh et al.
2019/0356940 A1 11/2019 Mallett
2019/0364204 A1 11/2019 Wozniak et al.
2019/0364205 A1 11/2019 Wozniak et al.
2019/0373240 A1 12/2019 Alshina et al.
2019/0373245 A1 12/2019 Lee et al.
2019/0373287 A1 12/2019 Lim et al.
2019/0379856 A1 12/2019 Hur et al.
2019/0379876 A1 12/2019 Hur et al.
2019/0387212 A1 12/2019 Oh
2020/0014905 A1 1/2020 Oh
2020/0021791 A1 1/2020 Hur et al.
2020/0043133 A1 2/2020 Boyce
2020/0045286 A1 2/2020 Boyce
2020/0053330 A1 2/2020 Takahashi et al.
2020/0053393 A1 2/2020 Niamut et al.
2020/0059668 A1 2/2020 Ikonin

(56) References Cited

U.S. PATENT DOCUMENTS

2020/0074687 A1 3/2020 Lin et al.
2020/0077070 A1 3/2020 Takahashi et al.
2020/0077092 A1 3/2020 Lin et al.
2020/0105063 A1 4/2020 Wang et al.
2020/0107008 A1 4/2020 Hur et al.
2020/0111193 A1 4/2020 Rephaeli et al.
2020/0128238 A1 4/2020 Lee
2020/0137417 A1 4/2020 Izumi
2020/0137418 A1 4/2020 Onno et al.
2020/0145663 A1 5/2020 Li et al.
2020/0153885 A1 5/2020 Lee et al.
2020/0162713 A1 5/2020 Zink et al.
2020/0162716 A1 5/2020 Sasaki
2020/0177859 A1 6/2020 Sasaki
2020/0177862 A1 6/2020 Routhier
2020/0177916 A1 6/2020 Niamut et al.
2020/0193232 A1 6/2020 Wang et al.
2020/0195906 A1 6/2020 Van Hoff et al.
2020/0221061 A1 7/2020 Kim et al.
2020/0228843 A1 7/2020 Lin et al.
2020/0252594 A1 8/2020 Lee et al.
2020/0265618 A1 8/2020 Chen et al.
2020/0267385 A1 8/2020 Lim et al.
2020/0273205 A1 8/2020 Yamashita et al.
2020/0275088 A1 8/2020 Colin et al.
2020/0275129 A1 8/2020 Deshpande
2020/0279438 A1 9/2020 Ohashi
2020/0286206 A1 9/2020 Lu
2020/0288169 A1 9/2020 Liu et al.
2020/0296302 A1 9/2020 Shiro et al.
2020/0296350 A1 9/2020 Oh
2020/0320747 A1 10/2020 Izumi
2020/0322586 A1 10/2020 Lee et al.
2020/0322632 A1 10/2020 Hanhart et al.
2020/0336720 A1 10/2020 Rogozinski et al.
2020/0336762 A1 10/2020 Lee et al.
2020/0344489 A1 10/2020 Wenger et al.
2020/0351449 A1 11/2020 Oh et al.
2020/0359007 A1 11/2020 Izumi
2020/0374504 A1 11/2020 Taylor
2020/0374505 A1 11/2020 Kammachi Sreedhar et al.
2020/0374558 A1 11/2020 Li et al.
2020/0389573 A1 12/2020 Kobayashi
2020/0413093 A1 12/2020 Newman et al.
2021/0004932 A1 1/2021 Newman et al.
2021/0018756 A1 1/2021 Henry et al.
2021/0037225 A1 2/2021 Pepperell et al.
2021/0042948 A1 2/2021 Morimoto
2021/0044747 A1 2/2021 Panchagnula et al.
2021/0051331 A1 2/2021 Konda et al.
2021/0058604 A1 2/2021 Nakata
2021/0067758 A1 3/2021 Choi et al.
2021/0090214 A1 3/2021 Newman et al.
2021/0092418 A1 3/2021 Han et al.
2021/0112275 A1 4/2021 Kk et al.
2021/0127059 A1* 4/2021 Powell ...................... G06T 5/80
2021/0176446 A1 6/2021 Oh et al.
2021/0188167 A1 6/2021 Fursich et al.
2021/0203995 A1 7/2021 Lee et al.
2021/0266506 A1 8/2021 Ichieda
2021/0274146 A1 9/2021 Oh et al.
2021/0294558 A1 9/2021 Griffin
2021/0314558 A1 10/2021 Choi et al.
2021/0314647 A1 10/2021 Mallett
2021/0321072 A1 10/2021 Oh et al.
2021/0329214 A1 10/2021 Oh et al.
2021/0337243 A1 10/2021 Oh et al.
2021/0368157 A1 11/2021 Overbeck et al.
2021/0385423 A1 12/2021 Oh et al.
2021/0398358 A1 12/2021 Seiler
2021/0407214 A1 12/2021 Le Roux et al.
2022/0014731 A1 1/2022 Bang et al.
2022/0020109 A1 1/2022 Hsu et al.
2022/0030264 A1 1/2022 Niamut et al.
2022/0038709 A1 2/2022 Da Silva Pratas Gabriel et al.
2022/0083262 A1 3/2022 Proulx et al.
2022/0129159 A1 4/2022 Randall et al.
2022/0161720 A1* 5/2022 Fürsich .................. H04N 7/181
2022/0200815 A1 6/2022 Schwitalla et al.
2022/0203249 A1 6/2022 Green et al.
2022/0217314 A1 7/2022 Oh et al.
2022/0224871 A1 7/2022 Van Brandenburg et al.
2022/0256131 A1 8/2022 Oh et al.
2022/0329772 A1 10/2022 Otsuka
2022/0345721 A1 10/2022 Otsuka
2023/0032321 A1* 2/2023 Grillo .................... H04N 23/81
2023/0043464 A1 2/2023 Song et al.
2023/0050797 A1 2/2023 King
2023/0051412 A1 2/2023 Da Silva Pratas Gabriel et al.
2023/0051471 A1 2/2023 Kim et al.
2023/0086983 A1 3/2023 Won
2023/0093097 A1 3/2023 Nolan et al.
2023/0099005 A1 3/2023 Tomono
2023/0154063 A1 5/2023 Backer
2023/0179798 A1 6/2023 Hamada
2023/0209205 A1 6/2023 Hu et al.
2023/0226768 A1 7/2023 Kothari et al.
2023/0237628 A1 7/2023 Gharbi et al.
2023/0262208 A1 8/2023 Appelgate et al.
2023/0308622 A1 9/2023 Sawada et al.
2023/0316457 A1 10/2023 Morgan et al.
2023/0360572 A1 11/2023 Welck
2023/0362409 A1 11/2023 Chupeau et al.
2023/0388464 A1 11/2023 Yoshida
2023/0409884 A1 12/2023 Sakamoto et al.
2024/0007610 A1 1/2024 Takahashi et al.
2024/0018487 A1 1/2024 Alam
2024/0020927 A1 1/2024 Kovacevic et al.
2024/0037713 A1 2/2024 O'Neil et al.
2024/0062689 A1 2/2024 Yang et al.
2024/0161232 A1 5/2024 Akbarpour et al.
2024/0205513 A1 6/2024 Kozuka et al.
2024/0214529 A1 6/2024 DaSilva et al.
2024/0214535 A1 6/2024 Graae et al.
2024/0214690 A1 6/2024 DaSilva et al.
2024/0223738 A1 7/2024 Arimatsu et al.
2024/0232659 A1 7/2024 Kakuda et al.
2024/0233240 A1 7/2024 Demeure et al.
2024/0269553 A1 8/2024 Li et al.
2024/0323310 A1 9/2024 Hasegawa et al.
2024/0331117 A1 10/2024 Xu et al.
2024/0346970 A1 10/2024 Welck
2024/0348763 A1 10/2024 Cardenas Gasca et al.
2024/0348766 A1 10/2024 Wu et al.
2024/0392593 A1 11/2024 Meier et al.
2024/0420277 A1 12/2024 Porubanova et al.
2024/0428511 A1 12/2024 Ward et al.
2025/0131533 A1 4/2025 Jang et al.
2025/0148569 A1 5/2025 Herman et al.
2025/0157133 A1 5/2025 Snavely et al.
2025/0193351 A1 6/2025 Kubota et al.
2025/0292498 A1 9/2025 Badki et al.
2025/0294306 A1 9/2025 Fan et al.

OTHER PUBLICATIONS

International Search Report and Written Opinion directed to related International Application No. PCT/US2023/081788, mailed Mar. 19, 2024; 12 pages.
Office Action for European Application No. 25176817.2, mailed Oct. 7, 2025, 2 pages.
Merriam-Webster, "Something That is Introduced or Inserted : An Insertion or Addition or the Process of Calculating an Approximate Value Based on Values That Are Already Known," Retrieved from internet URL: https://www.merriam-webster.com/dictionary/interpolation.
International Search Report and Written Opinion for Application No. PCT/US2023/081767, mailed on May 16, 2024, 18 pages.

* cited by examiner

CAPTURING IMAGES FOR A SPHERICAL VENUE

CROSS-REFERENCE TO RELATED APPLICATIONS

The present application claims the benefit of U.S. Provisional Patent Appl. No. 63/434,309, filed Dec. 21, 2022, which is incorporated herein by reference in its entirety.

BACKGROUND

Content creators often use a conventional ultra-wide-angle lens, such as a conventional fisheye lens to provide an example, to capture conventional images that are to be displayed by a conventional three-dimensional media plane. The conventional fisheye lens represents one type of ultra-wide-angle lens that produces strong visual distortion, for example, a convex non-rectilinear appearance, which is intended to create one or more hemispherical images for display by the conventional three-dimensional media plane. Often times, a center of the conventional fisheye lens can be associated with a conventional prime viewing section that is situated at a top, or a crown, of the conventional three-dimensional media plane. Typically, the conventional prime viewing section can be characterized as having the highest optical image quality, for example, resolution, as compared to other viewing sections of the conventional three-dimensional media plane. The optical image quality of the one or more images that are captured by the conventional fisheye lens that are presented onto the conventional three-dimensional media plane lessens in optical image quality from the conventional prime viewing section toward a bottom, or a springing, of the conventional three-dimensional media plane with the lowest optical image quality being at the bottom of the conventional three-dimensional media plane.

The content creators often capture conventional images that are to be displayed by the conventional three-dimensional media plane during an event. Typically, the event can be characterized as including one or more performers that are situated toward the bottom of the conventional three-dimensional media plane. Often times, the conventional three-dimensional media plane can display the images as the one or more performers are performing. As such, an audience that is experiencing the event within the conventional venue typically focuses its field of view on the one or more performers toward the bottom of the conventional three-dimensional media plane. As a result, the audience would be viewing the images on the conventional three-dimensional media plane at their lowest optical image quality. The audience would be required to shift its field of view toward the conventional prime viewing section at the top of the conventional three-dimensional media plane, namely, look-up, to experience the images at their highest optical image quality which would cause the one or more performers to no longer be in its field of view.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1A:
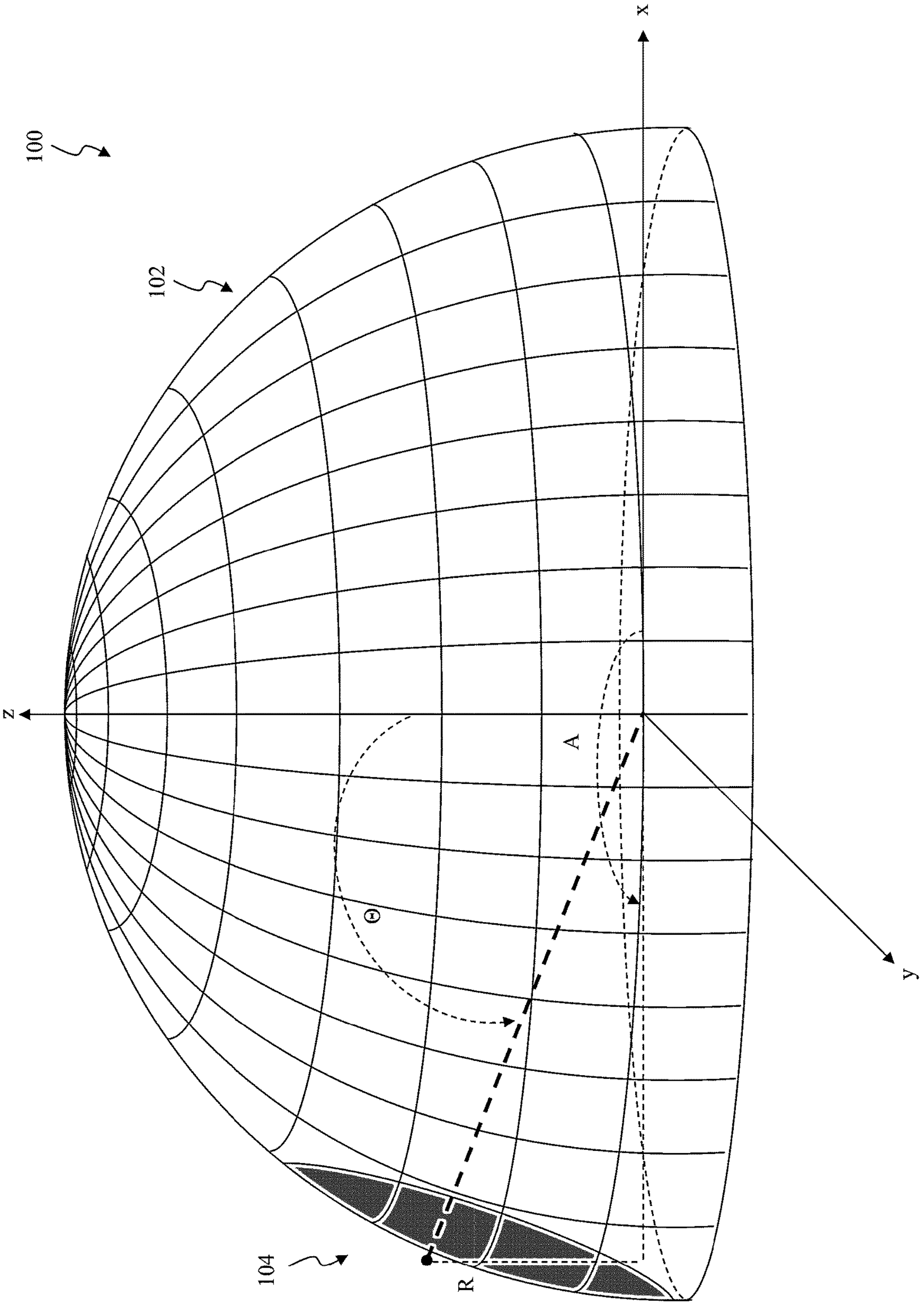
FIG. 1A and FIG. 1B illustrate pictorial representations of an exemplary venue according to some exemplary embodiments of the present disclosure.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

Overview

Systems, methods, and apparatuses disclosed herein can include an exemplary image capture system to capture light that is related to one or more images within its field of view and/or an exemplary image projection system to transform the one or more images for projection onto a three-dimensional media plane of a three-dimensional venue. The exemplary image capture system can direct rays of light that were captured by the exemplary image capture system onto an image sensor that is associated with the exemplary image capture system. As to be described in further detail below, the exemplary image capture system can focus these rays of light toward a periphery, or edge, of the image sensor. As a result, the three-dimensional venue can display the highest optical image quality for the one or more images toward a bottom, or a springing, of the three-dimensional media plane. Moreover, the exemplary image capture system can be specifically manufactured to heterogeneously, for example, non-uniformly, distribute the rays of light that were captured by the exemplary image capture system onto the image sensor to further enhance the highest optical image quality for the one or more images. As to be described in further detail below, the exemplary image projection system can project the one or more images onto the three-dimensional media plane of the three-dimensional venue. As part of this projecting, the exemplary image projection system can mathematically transform two-dimensional coordinates of pixels of the one or more images onto three-dimensional coordinates of the three-dimensional media plane to project the one or more images onto the three-dimensional media plane. And as part of this projecting, the exemplary image projection system can statistically interpolate color information that is to be projected onto the three-dimensional media plane from the one or more images.

Projection of Images onto an Exemplary Venue of the Present Disclosure

Figure 1B:
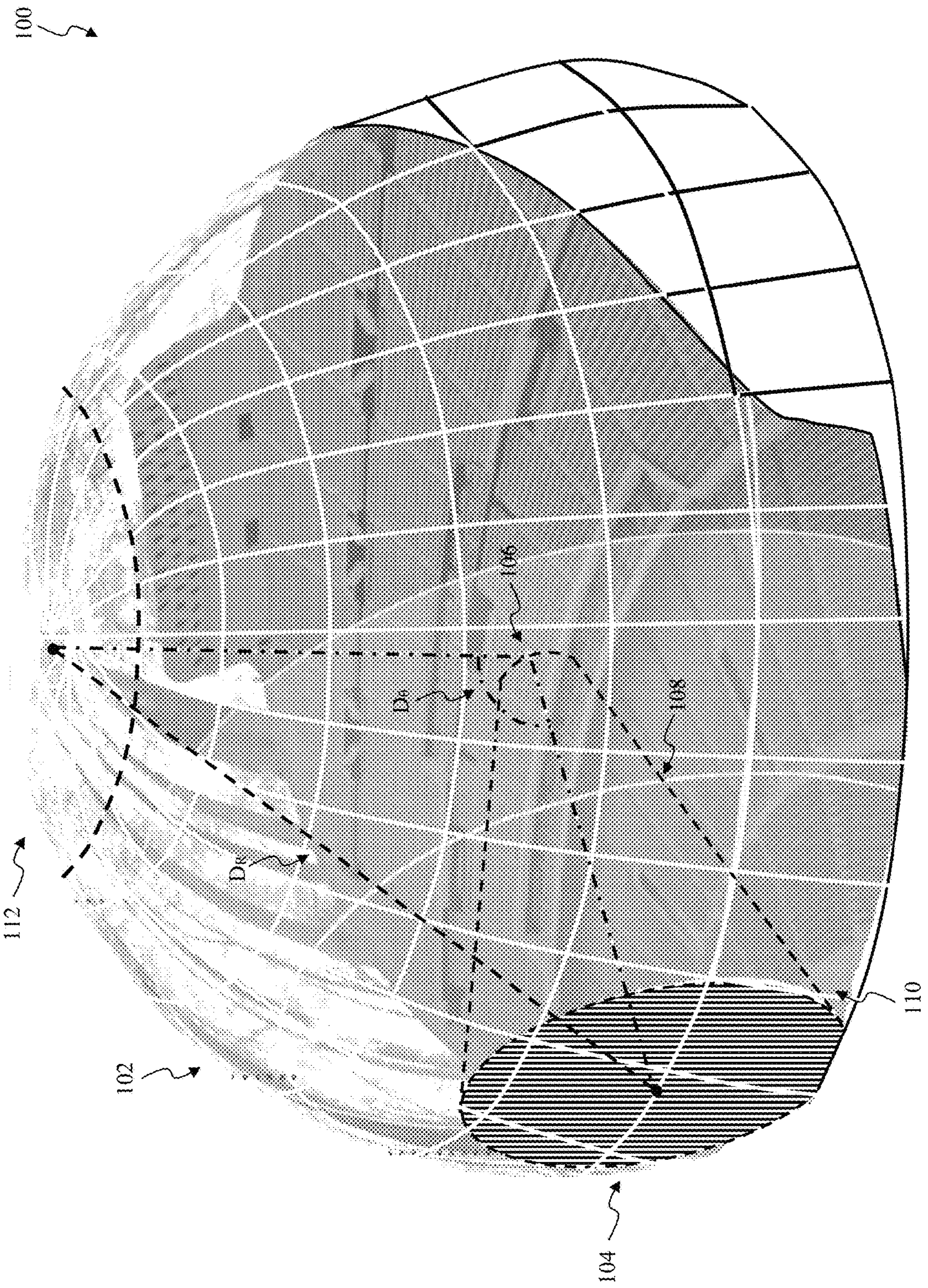

FIG. 1A and FIG. 1B illustrate pictorial representations of an exemplary venue according to some exemplary embodiments of the present disclosure. In the exemplary embodiment illustrated in FIG. 1A and FIG. 1B, a venue 100 represents a location for hosting an event. For example, the venue 100 can represent a music venue, for example, a music theater, a music club, and/or a concert hall, a sporting venue, for example, an arena, a convention center, and/or a stadium, and/or any other suitable venue that will be apparent to those skilled in the relevant(s) without departing the spirit and scope of the present disclosure. The event can include a musical event, a theatrical event, a sporting event, a motion picture, and/or any other suitable event that will be apparent to those skilled in the relevant(s) without departing the spirit and scope of the present disclosure. In the exemplary embodiment illustrated in FIG. 1A and FIG. 1B, the venue 100 can represent a three-dimensional structure, for example, a hemisphere structure, also referred to as a hemispherical dome, for hosting the event. In some embodiments, the venue 100 can include a three-dimensional media plane 102 for displaying one or more images that can be associated with the event that is spread across the interior, or intrados, of the venue 100. In some embodiments, the three-dimensional media plane 102 can include a series of rows and a series of columns of picture elements, also referred to as pixels, in three-dimensional space. In these embodiments, the pixels can be implemented using one or more light-emitting diode (LED) displays, one or more organic light-emitting diode (OLED) displays, and/or one or more quantum dots (QDs) displays to provide some examples. For example, the three-dimensional media plane 102 can include an approximate 16,000 by 16,000 resolution three-dimensional media plane in the three-dimensional space that wraps around the interior of the venue 100 to form an approximate 160,000 square foot visual display.

In some embodiments, the venue 100 can project the one or more images onto the three-dimensional media plane 102. In these embodiments, the one or more images can be projected onto the three-dimensional media plane 102 during the event to enhance the visual experience of the audience in viewing the event. As illustrated in FIG. 1A, the three-dimensional media plane 102 can include an audience prime viewing section 104 having the highest optical image quality that is situated along the interior, or intrados, of the three-dimensional media plane 102. In some embodiments, the audience prime viewing section 104 can be approximately situated at a haunch, which lies approximately halfway between the top and the base, of the three-dimensional media plane 102 with an approximate center of the audience prime viewing section 104 being denoted in a spherical coordinate system as (R, A, Θ). The audience prime viewing section 104 can be characterized as having the highest optical image quality, for example, resolution, as compared to other viewing sections of the three-dimensional media plane 102. In some embodiments, the optical image quality of the one or more images projected onto the three-dimensional media plane 102 lessens from the highest optical image quality of the audience prime viewing section 104 toward another viewing section that is diametrically opposite to the audience prime viewing section 104 along the interior of the three-dimensional media plane 102. As to be described in further detail below, an exemplary image capture system can be utilized to capture the one or more images that, when projected onto the three-dimensional media plane 102, having the highest optical image quality situated within the audience prime viewing section 104. And as to be described in further detail below, an exemplary image projection system can be utilized to transform two-dimensional coordinates of the one or more images onto three-dimensional coordinates of the three-dimensional media plane to allow the one or more images to be projected onto the three-dimensional media plane.

In some embodiments, a center of a conventional prime viewing section 112 as described above can be denoted in a spherical coordinate system as (r, α, θ). In these embodiments, a distance $D_R$ between the center of the audience prime viewing section 104 and a center of conventional prime viewing section 112 can be denoted as:

$$D_R = \sqrt[2]{r^2 + R^2 - 2rR(\sin\theta\sin\Theta\cos(\alpha - A) + \cos(\alpha)\cos(A))}. \tag{1}$$

And a difference $D_\theta$ between the polar angles between the center of the audience prime viewing section 104 and the conventional prime viewing section can be denoted as:

$$D_\theta = \Theta - \theta. \tag{2}$$

In some embodiments, the center of the conventional prime viewing section 112 can be considered to be offset from the center of the audience prime viewing section 104 by the difference $D_\theta$. For example, the difference $D_\theta$ can be between approximately 30 degrees and approximately 90 degrees. In this example, the audience prime viewing section 104 can be considered to be offset from the conventional prime viewing section 112 between approximately 30 degrees and approximately 90 degrees.

As illustrated in FIG. 1B, the venue 100 can include one or more seating sections for seating an audience to experience the event. In some embodiments, the audience prime viewing section 104 can be specifically designated by, for example, the image capture system 200 as to be described in further detail below, to allow one or more audience members 106 from among the audience seated within the venue 100 to view the one or more images projected onto the three-dimensional media plane 102 at their highest optical image quality. In some embodiments, the one or more audience members 106 can include audience members from one or more rows of seats within the venue 100 and/or one or more sections of seats within the venue 100 to provide some examples. And as illustrated in FIG. 1B, the audience prime viewing section 104 can be specifically tailored to coincide with a field of view 108 of the one or more audience members 106 as the one or more audience members 106 are experiencing the event. As an example, the field of view 108 can correspond to fields of view of audience members within prime seating areas, for example, luxury suites, within the venue 100. In some embodiments, the one or more audience members 106 can be considered to experience the one or more images projected at their highest optical image quality. In some embodiments, the event, as described above, can be characterized as having one or more performers that are situated toward the bottom of the three-dimensional media plane 102. In these embodiments, the one or more performers can be on a stage 110 that is situated toward the bottom of the three-dimensional media plane 102. In these embodiments, the audience prime viewing section 104 can be situated behind the one or more performers to allow the one or more audience members 106 to simultaneously view the one or more performers and the one or more images at their highest optical image quality. In other words, the audience prime viewing section 104 can be situated within the field of view 108 of the one or more audience members 106 as the one or more audience members 106 are viewing the one or more performers.

Exemplary Image Capture System for Capturing the Images

Figure 2A:
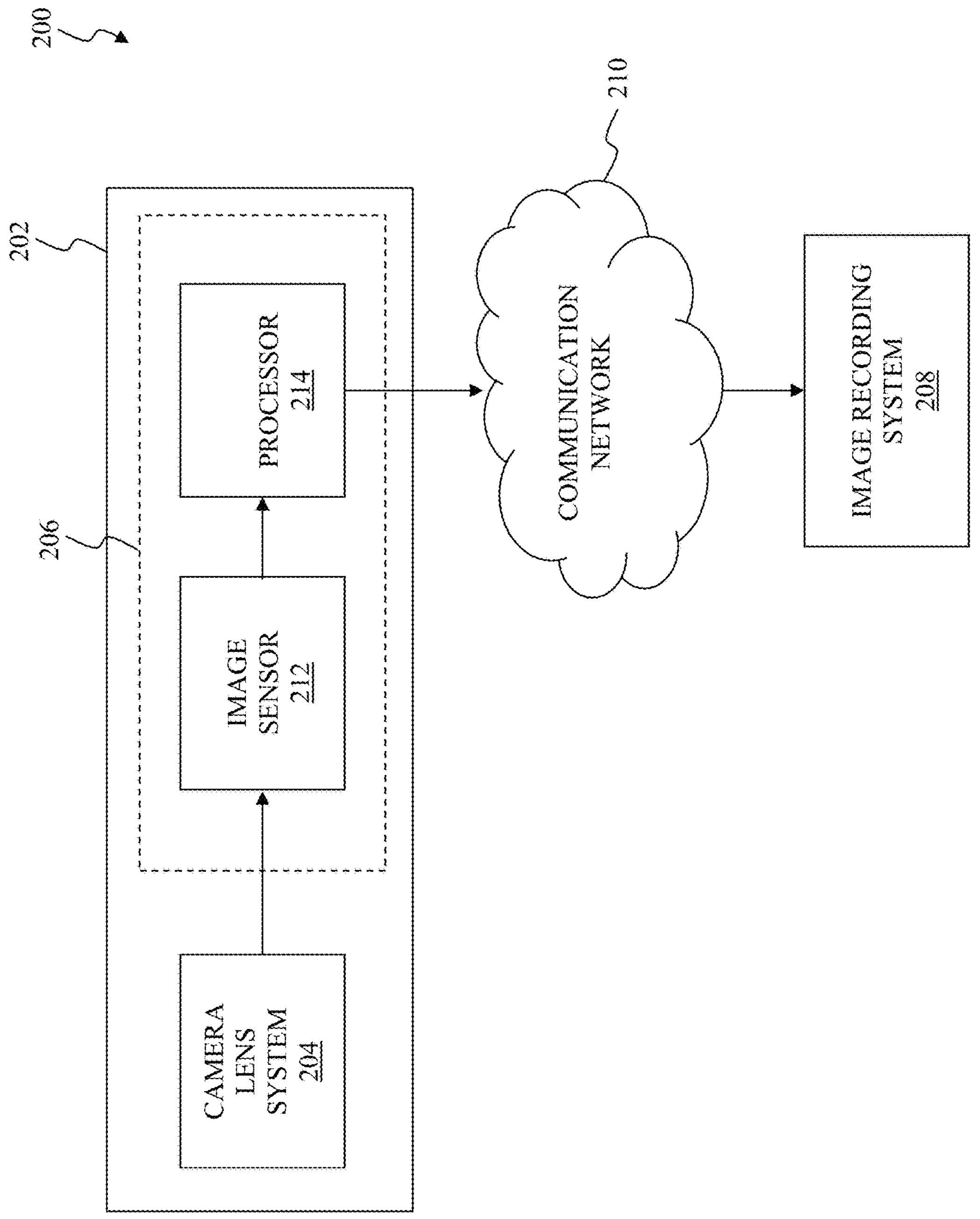
FIG. 2A illustrates a simplified block diagram of an exemplary image capture system according to some exemplary embodiments of the present disclosure.

FIG. 2A illustrates a simplified block diagram of an exemplary image capture system according to some exemplary embodiments of the present disclosure. In the exemplary embodiment illustrated in FIG. 2A, an image capture system 200 captures light that is related to one or more images that can be projected onto a three-dimensional media plane of a venue, such as the three-dimensional media plane 102 of the venue 100 as described above in FIG. 1A and FIG. 1B. As to be described in further detail below, the image capture system 200 can be utilized to capture the one or more images that, when projected onto the three-dimensional media plane, having the highest optical image quality situated within an audience prime viewing section of the three-dimensional media plane, such as the audience prime viewing section 104 as described above in FIG. 1A and FIG. 1B. As to be described in further detail below, the image capture system 200 can direct rays of light that were captured by the image capture system 200 onto an image sensor that is associated with the image capture system 200. As to be described in further detail below, the image capture system 200 can focus these rays of light toward a periphery, or edge, of the image sensor. As a result, the three-dimensional venue can display the highest optical image quality for the one or more images within the having the highest optical image quality situated within the audience prime viewing section of the three-dimensional media. Moreover, the image capture system 200 can be specifically manufactured to heterogeneously, for example, non-uniformly, distribute the rays of light that were captured by the exemplary image capture system onto the image sensor to further enhance the highest optical image quality for the one or more images. As illustrated in FIG. 2A, the image capture system 200 can include a camera system 202 having a camera lens system 204 and a camera assembly 206 that can be communicatively coupled to an image recording system 208 via a communication network 210. Although the image capture system 200 is illustrated in FIG. 2A as including multiple, discrete devices, those skilled in the relevant art(s) will recognize that one of more of these devices can be combined without departing from the spirit and scope of the present disclosure. For example, the camera system 202 can include the camera lens system 204, the camera assembly 206, and/or the image recording system 208 as a single discrete device without the communication network 210 as will be apparent to those skilled in the relevant art(s) without departing from the spirit and scope of the present disclosure.

In the exemplary embodiment illustrated in FIG. 2A, the camera lens system 204 projects light that is related to one or more images, for example, a scene, within its field of view onto an image sensor 212 of the camera assembly 206 that is to be described in further detail below. In some embodiments, the camera lens system 204 can focus, for example, converge, the light that is captured onto the image sensor 212 to generate the one or more images for projection onto the three-dimensional media plane of the venue. For example, the camera lens system 204 can focus the light that is reflected from one or more physical objects within the scene onto the image sensor 212 to generate one or more images of the one or more physical objects for projection onto the three-dimensional media plane of the venue. In the exemplary embodiment illustrated in FIG. 2A, the camera lens system 204 can include a camera lens housing and a camera lens system. In some embodiments, the camera lens housing can be implemented to form a perspective-control lens, such as a shift lens or a tilt-shift lens to provide some examples. Referring to FIG. 1A and FIG. 1B above, the perspective-control lens can be utilized by the image capture system 200 to focus, for example, converge, the light that is captured by the image capture system 200 onto one or more sections of the image sensor 212 that are associated with the audience prime viewing section of the three-dimensional media plane. In some embodiments, the perspective-control lens can change the orientation or the position of the camera lens system, for example, tilt, shift, and/or rotate, with respect to the camera assembly 206 to designate the one or more sections of the image sensor 212. For example, the perspective-control lens can steer the orientation or the position of a center of the camera lens system, for example, a center of an ultra-wide-angle lens, such as a fisheye lens or a rectilinear lens, with respect to the image sensor 212. Generally, the ultra-wide-angle lens represents any suitable lens having a field of view between approximately one hundred (100) and approximately one-hundred eighty (180) degrees that will be recognized by those skilled in the relevant art(s) without departing from the spirit and scope of the present disclosure. In this example, the perspective-control lens can steer the orientation or the position of the center of the camera lens system to toward a periphery, for example, an edge, of the image sensor 212 to focus light that is captured by the center of the camera lens system toward the periphery of the image sensor 212. In some embodiments, the periphery, for example, the edge, of the image sensor 212 can be approximated as the outermost one-eighth to one-fourth of the surface area of the image sensor 212. As such, when the one or more images that are projected near the periphery of the image sensor 212 are projected onto the three-dimensional media plane as described above in FIG. 1A and FIG. 1B, the highest optical image quality of the one or more images can be situated along the interior of the three-dimensional media plane within the audience prime viewing section.

In some embodiments, the camera lens system can include a simple single lens of transparent material; however, more complicated compound lenses of transparent material, such as doublet lenses, triplet lenses, and/or achromatic lenses, are possible as will be apparent to those skilled in the relevant art(s) without departing from the spirit and scope of the present disclosure. In these embodiments, the transparent material can include glass, crystal, and/or plastic, such as acrylic to provide an example. In some embodiments, these complicated compound lenses can be configured and arranged to form an ultra-wide-angle lens, such as a fisheye lens that produces strong visual distortion intended to create one or more hemispherical images and/or a rectilinear lens with little or no barrel or pincushion distortion that yields one or more images where straight features, such as the edges of walls of buildings, appear with straight lines, as opposed to being curved as with the fisheye lens to provide some examples. In some embodiments, the ultra-wide-angle lens can be specifically manufactured to direct the light that is captured by the camera lens system to be heterogeneously, for example, non-uniformly, distributed onto the image sensor 212 about an approximate a center of the image sensor 212. In these embodiments, the angular distribution of the light can be characterized as being non-uniform across the image sensor 212 as compared to the conventional ultra-wide-angle lens as described above that projects light uniformly. For example, the camera lens system can focus the light onto the image sensor 212 to be more concentrated near the center of the image sensor 212 as compared to the periphery of the image sensor 212. In some embodiments, the camera lens system can concentrate the light near the center of the image sensor 212 to project more detail for the one or more images, for example, more detail of the scene, near the center of the image sensor 212. As such, when the camera lens system 204 includes the perspective-control lens that heterogeneously distributes the light that is captured by the perspective-control lens, the one or more images that are projected within the audience prime viewing section includes even more detail, and hence an even greater resolution, within the audience prime viewing section as compared to implementing the camera lens system 204 with only the perspective-control lens.

The camera assembly 206 captures the light that is focused onto the image sensor 212 by the camera lens system 204 to provide one or more digital image signals, also referred to as raw image data, that are associated with the one or more images. In some embodiments, the camera assembly 206 can reconstruct the one or more images from the one or more digital image signals. In the exemplary embodiment illustrated in FIG. 2A, the camera assembly 206 can include the image sensor 212 and a processor 214. Generally, the image sensor 212 converts the light, namely the photons, which is focused onto the image sensor 212 by the camera lens system 204 into electrical signals. In some embodiments, the image sensor 212 can convert the electrical signals from a representation in the analog signal domain to a representation in the digital signal domain to provide the one or more digital image signals that are be stored by the image recording system 208 as to be described in further detail below. In some embodiments, the image sensor 212 can include small picture elements, also referred to as pixels, which can include light sensitive elements, micro lenses, and/or micro electrical components. In some embodiments, the pixels can be configured and arranged as a series of rows and a series of columns to form an array of pixels, for example, a square array of pixels. In these embodiments, the image sensor 212 can include 18,000 rows of pixels and 18,000 columns of pixels to form an 18,000 by 18,000 square array of pixels. In some embodiments, the image sensor 212 can be implemented as a charge-coupled device (CCD) or an active-pixel sensor that can be fabricated in complementary metal-oxide-silicon (CMOS) and/or n-type metal-oxide-silicon (NMOS) technologies. In these embodiments, the image sensor 212 can be implemented as a color sensor that includes a color mask, such as a Bayer mask to provide an example, that absorbs undesired color wavelengths so that each pixel of the image sensor 212 is sensitive to a specific color wavelength and/or a monochromatic sensor without the color mask so that each pixel of the image sensor 212 is sensitive to all visible light wavelengths. In these embodiments, the one or more digital image signals can include color information, for example, luminance and/or chrominance components of YUV color model and/or red, green, and/or blue components of a RGB color model to provide some examples, of each pixel of the image sensor 212.

The processor 214 can provide the one or more digital image signals that are developed by the image sensor 212 to the image recording system 208. Alternatively, or in addition to, the processor 214 can reconstruct the one or more images from the one or more digital image signals and thereafter provide the one or more images to the image recording system 208. In these embodiments, the processor 214 can implement one or more digital image processing techniques, also referred to as digital picture processing techniques, to process the one or more digital image signals that are developed by the image sensor 212 to reconstruct the one or more images from the one or more digital image signals. In some embodiments, the one or more digital image processing techniques can include decoding, demosaicing, defective pixel removal, white balancing, noise reduction, color translation, tone reproduction, compression, removal of systematic noise, dark frame subtraction, optical correction, contrast manipulation, unsharp masking, and/or any other suitable well known digital image processing technique that will be apparent to those skilled in the relevant art(s) without departing from the spirit and scope of the present disclosure. In some embodiments, the processor 214 can format the one or more digital image signals and/or the one or more images for transmission to the image recording system 208 over the communication network 210. In some embodiments, the processor 214 can compress the one or more digital image signals and/or the one or more images using, for example, lossless compression techniques, such as Lempel-Ziv based lossless compression techniques, and/or lossy compression techniques, such as discrete cosine transform (DCT) based lossy compression techniques. In some embodiments, the processor 214 can include, or be coupled to, an electrical-to-optical converter to transform the one or more digital image signals from electrical signals to optical signals for transmission over a fiber optic network.

The image recording system 208 can store the one or more digital image signals and/or the one or more images provided by the processor 214. As to be described in further detail below, the one or more digital image signals and/or the one or more images can be further processed by an image projection system for projection onto the three-dimensional media plane of the venue plane in a substantially similar manner as described above in FIG. 1A and FIG. 1B. In some embodiments, the image recording system 208 can store the one or more digital image signals as raw camera image files having radiometric characteristics of the light captured by the image capture system. These radiometric characteristics can include color information, for example, luminance and/or chrominance components of YUV color model and/or red, green, and/or blue components of a RGB color model to provide some examples, of each pixel of the image sensor. Alternatively, or in addition to, the image recording system 208 can store the one or more images in any suitable well-known image file format, such as Joint Photographic Experts Group (JPEG) image file format, Exchangeable Image File Format (EXIF), Tagged Image File Format (TIFF), Graphics Interchange Format (GIF), bitmap image file (BMP) format, or Portable Network Graphics (PNG) image file format to provide some examples, that will be apparent to those skilled in the relevant art(s) without departing from the spirit and scope of the present disclosure. In some embodiments, the image recording system 208 can include a machine-readable medium to store the one or more digital image signals and/or the one or more images provided by the processor 214 in a form readable by a machine, such as a computing device to provide an example. In these embodiments, the machine-readable medium can include read only memory (ROM), random access memory (RAM), magnetic disk storage media, optical storage media, flash memory devices, among others. Alternately, or in addition to, the machine-readable medium can include a hard disk drive, for example, a solid-state driver, a floppy disk drive along with associated removable media, a CD-ROM drive, an optical drive, a flash memory, or removable media cartridges to persistently storage the one or more digital image signals by the camera assembly 206.

The communication network 210 communicatively couples the camera system 202 and the image recording system 208. The communication network 210 can implemented as a wireless communication network, a wireline communication network, and/or any combination thereof that will be apparent to those skilled in the relevant art(s) without departing from the spirit and scope of the present disclosure. In some embodiments, the communication network 210 can include a fiber optic network and/or a coaxial network that uses optical fiber and/or coaxial cable to deliver the one or more digital image signals and/or the one or more images from the camera system 202 to the image recording system 208. In some embodiments, the communication network 210 can include a hybrid fiber coaxial (HFC) network that combines optical fiber and coaxial cable to deliver the one or more digital image signals and/or the one or more images from the camera system 202 to the image recording system 208.

Figure 2B:
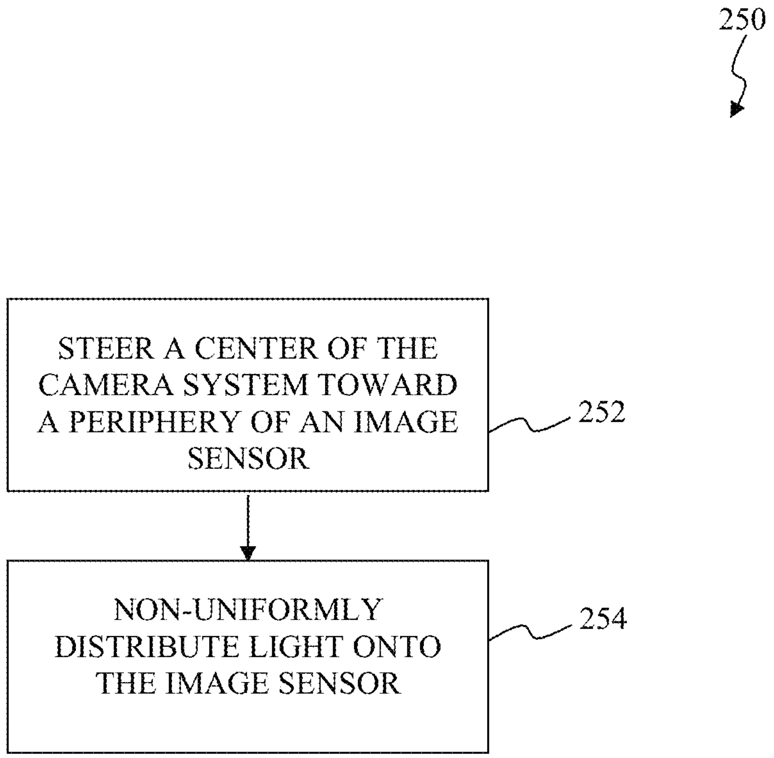
FIG. 2B illustrates a flowchart of an exemplary operation of an exemplary camera system that that can be implemented within the exemplary image capture system according to some exemplary embodiments of the present disclosure.

Exemplary Camera System that can be Implemented within the Exemplary Camera System FIG. 2B illustrates a flowchart of an exemplary operation of an exemplary camera system that that can be implemented within the exemplary image capture system according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 250 for projecting light that is related to one or more images, for example, a scene, within its field of view onto an image sensor. The operational control flow 250 can be executed by a camera system having a camera lens system and a camera assembly, such as the camera system 202 having the camera lens system 204 and the camera assembly 206 as described above in FIG. 2A.

At operation 252, the operational control flow 250 can steer a center of the camera lens system toward a periphery of an image sensor of the camera assembly to direct light that is captured by the center of the camera lens system toward a periphery, or an edge, of the image sensor. In some embodiments, the operational control flow 250 can change the orientation or the position of the camera lens system, for example, tilt, shift, and/or rotate, with respect to the camera assembly. For example, the operational control flow 250 can steer the orientation or the position of a center of the camera lens system, for example, a center of an ultra-wide-angle lens, such as a fisheye lens or a rectilinear lens, with respect to the image sensor. In this example, the operational control flow 250 can steer the orientation or the position of the center of the camera lens system to toward a periphery, for example, an edge, of the image sensor to focus light that is captured by the center of the camera lens system toward the periphery of the image sensor. In some embodiments, the operational control flow 250 can focus light that is captured from, for example, the one or more images, toward the periphery of the image sensor.

At operation 254, the operational control flow 250 can focus light that is captured by the camera lens system to be non-uniformly distributed onto the image sensor from operation 252 about the periphery of the image sensor. In some embodiments, the operational control flow 250 can direct the light that is captured by the camera lens system to be heterogeneously, for example, non-uniformly, distributed onto the image sensor from operation 252 about an approximate a center of the image sensor. In these embodiments, the angular distribution of the light can be characterized as being non-uniform across the image sensor from operation 252 as compared to the conventional ultra-wide-angle lens as described above that projects light uniformly. For example, the operational control flow 250 can focus the light onto the image sensor from operation 252 to be more concentrated near the center of the image sensor as compared to the periphery of the image sensor. In some embodiments, the operational control flow 250 can concentrate the light near the center of the image sensor to project more detail for the image, for example, more detail of the scene, near the center of the image sensor.

Figure 3A:
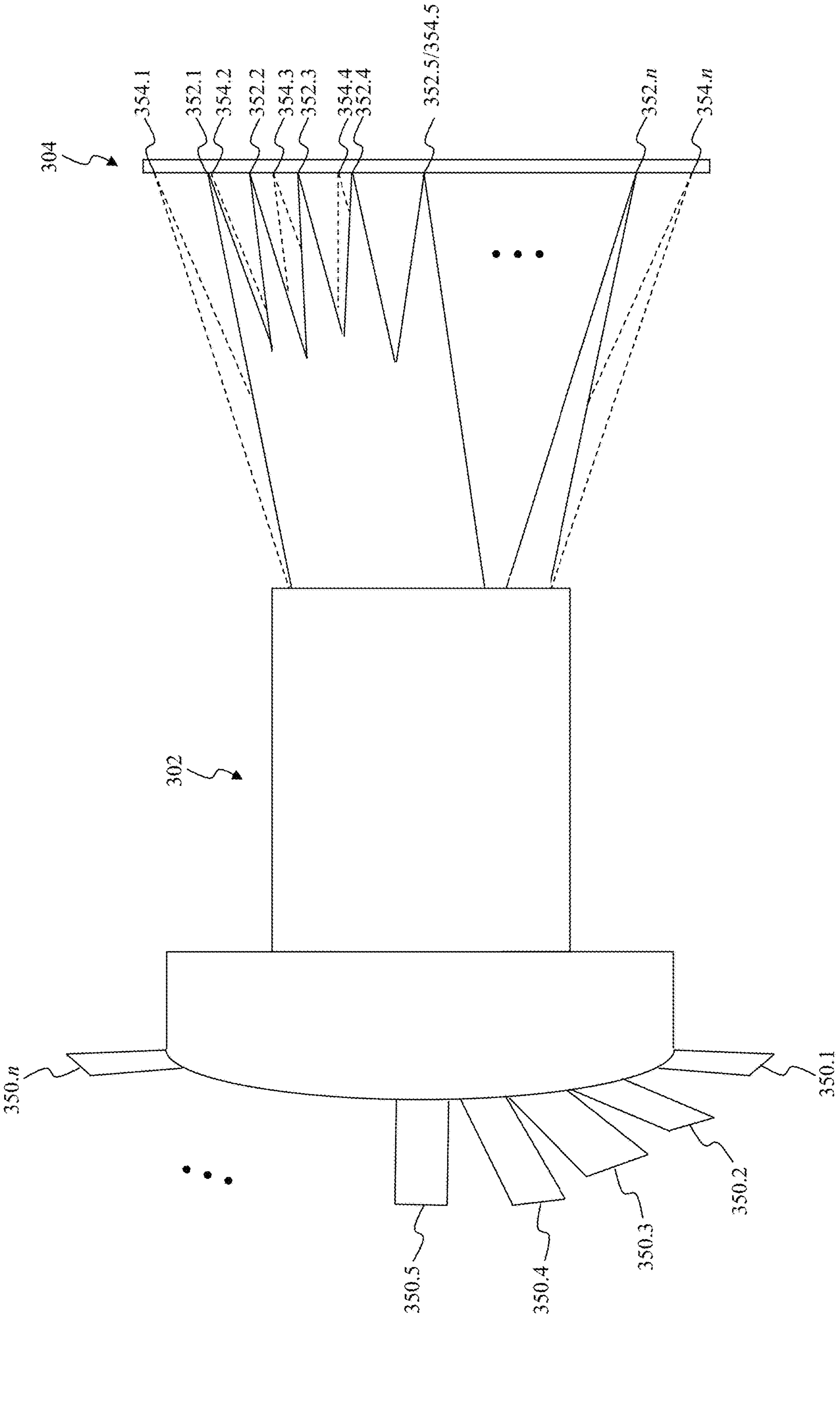
FIG. 3A and FIG. 3B illustrate simplified block diagrams of an exemplary camera lens system that can be implemented within the exemplary camera system according to some exemplary embodiments of the present disclosure.
Figure 3B:
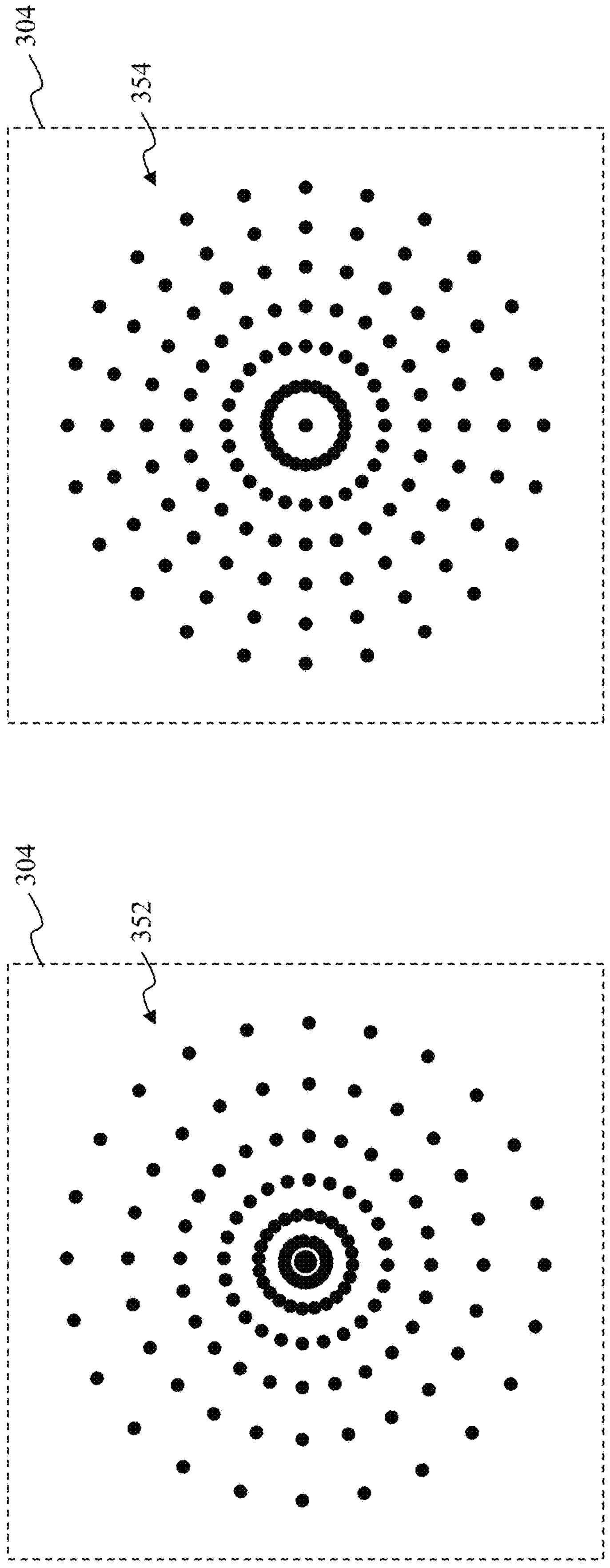

Exemplary Camera Lens System that can be Implemented within the Exemplary Camera System FIG. 3A and FIG. 3B illustrate simplified block diagrams of an exemplary camera lens system that can be implemented within the exemplary camera system according to some exemplary embodiments of the present disclosure. In the exemplary embodiment illustrated in FIG. 3A, a camera lens system 302 projects light that is related to one or more images, for example, a scene, within its field of view toward onto an image sensor 304. As to be described in further detail below, the camera lens system 302 can direct the light toward the image sensor 304 to provide a heterogeneous, for example, non-uniform, distribution of the light onto the image sensor 304. The camera lens system 302 and the image sensor 304 can represent exemplary embodiments of the camera lens system of the camera lens system 204 and the image sensor 212, respectively, as described above in FIG. 2A.

The camera lens system 302 is to be described in further detail below in terms of an exemplary ray tracing of rays of light 350.1 through 350.*n* onto the image sensor 304. However, it should be noted that the exemplary ray tracing as illustrated in FIG. 3A is for illustrative purposes only. Those skilled in the relevant art(s) will recognize that the rays of light 350.1 and 350.*n* can differ from those illustrated in FIG. 3A without departing from the spirit and scope of the present disclosure. As illustrated in FIG. 3A, the camera lens system 302 can capture the rays of light 350.1 through 350.*n* that are within its field of view. In some embodiments, the rays of light 350.1 through 350.*n* can be reflected from one or more physical objects within, for example, the scene that are within its field of view. In the exemplary embodiment illustrated in FIG. 3A, the rays of light 350.1 through 350.*n* can be characterized as having different incident angles in relation to the camera lens system 302. In some embodiments, rays of light nearest a periphery, or an edge, of the field of view of the camera lens system 302 from among the rays of light 350.1 through 350.*n*, for example, the ray of light 350.1 and the ray of light 350.*n*, can be characterized as having the largest incident angles, for example, approximately one-half the field of view of the camera lens system 302. For example, the camera lens system 302 can have a field of view of one hundred sixty (160) degrees. In this example, the ray of light 350.1 and the ray of light 350.*n* as illustrated in FIG. 3A can be characterized as having incident angles of approximately eighty (80) degrees in relation to the camera lens system 302. In some embodiments, a median ray of light from among the rays of light 350.1 through 350.*n*, for example, the ray of light 350.5, can be characterized as having the smallest incident angle, for example, approximately zero (0) degrees. In these embodiments, the median ray of light can be characterized as propagating parallel to the camera lens system 302.

After capturing the rays of light 350.1 through 350.*n*, the camera lens system 302 can focus, for example, converge, the rays of light 350.1 through 350.*n* using a simple single lens of transparent material; however, more complicated compound lenses of transparent material, such as doublet lenses, triplet lenses, and/or achromatic lenses, are possible as will be apparent to those skilled in the relevant art(s) without departing from the spirit and scope of the present disclosure. In these embodiments, the transparent material can include glass, crystal, and/or plastic, such as acrylic to provide an example. In some embodiments, these complicated compound lenses can be configured and arranged to form an ultra-wide-angle lens, such as a fisheye lens that produces strong visual distortion intended to create one or more hemispherical images and/or a rectilinear lens with little or no barrel or pincushion distortion that yields one or more images where straight features, such as the edges of walls of buildings, appear with straight lines, as opposed to being curved as with the fisheye lens to provide some examples.

After being focused by the camera lens system 302, the rays of light 350.1 through 350.*n* can exit the camera lens system 302 to provide rays of light 352.1 through 352.*n* toward the image sensor 304. In the exemplary embodiment illustrated in FIG. 3A, the camera lens system 302 can angularly distribute the rays of light 352.1 through 352.*n* heterogeneously, for example, non-uniformly, across the image sensor 304. For example, the angular distribution of the rays of light 352.1 through 352.*n* can be characterized as being non-uniform across the image sensor 304 as compared to conventional rays of light 354.1 through 354.*n* that exit a conventional ultra-wide-angle lens, for example, the conventional fisheye lens as described above. In this example, the conventional rays of light 354.1 through 354.*n* can be characterized as being uniformly distributed across the image sensor 304. As illustrated in FIG. 3B, the conventional rays of light 354.1 through 354.*n*, denoted simply as conventional rays of light 354 for convenience, can be uniformly distributed about a central ray of light that corresponds to the median ray of light from among the rays of light 350.1 through 350.*n*, for example, the ray of light 350.5. In some embodiments, the conventional rays of light 354 can be considered to be uniformly, or equally, spaced apart from one another about the central ray of light on the image sensor 304. And as illustrated in FIG. 3B, the rays of light 352.1 through 352.*n*, denoted simply as rays of light 352 for convenience, can be non-uniformly distributed about the central ray of light that corresponds to the median ray of light from among the rays of light 350.1 through 350.*n*, for example, the ray of light 350.5. In some embodiments, the rays of light 352.1 through 352.*n* can be considered to be non-uniformly, or differently, spaced apart from one another about the central ray of light on the image sensor 304. In these embodiments, the rays of light 352 can be more concentrated near a center of the image sensor 304 as compared to a periphery, or an edge, of the image sensor 304. In these embodiments, the pixels of the image sensor 304 can be distributed among the image sensor 304 to provide a first density of pixels, for example, seventy (70) pixels per degree (PPD), at a center of the image sensor 304 that tapers to a second density of pixels, for example, one hundred forty (140) pixels per degree (PPD), near the periphery of the image sensor 304. In these embodiments, the pixels of the image sensor 304 can linearly, for example, uniformly, and/or non-linearly, for example, non-uniformly, taper from the first density of pixels to the second density of pixels.

In some embodiments, the image sensor 304 can be characterized as having a lower angular resolution at the center as compared to the periphery of the image sensor 304 since the image sensor 304 captures more rays of light from among the rays of light 352.1 through 352.*n* near the center of the image sensor 304 as illustrated in FIG. 3A and FIG. 3B. In these embodiments, the angular resolution is related to the minimum angular distance between objects that the image sensor 304 assembly can discern resolvable detail. Typically, a lower angular resolution indicates that the image sensor 304 can discern more detail of the one or more images, for example, the scene, within its field of view as compared to a higher angular resolution. As such, a lower angular resolution is often associated with a higher optical image quality, for example, magnification, than a higher angular resolution. As illustrated in FIG. 3B, the lowest angular resolution, and hence, the highest optical image quality is near the center of the image sensor 304 where the concentration of the rays of light 352.1 through 352.*n* is at its largest and the highest angular resolution, and hence, the lowest optical image quality is near the periphery of the image sensor 304 where the concentration of the rays of light 352.1 through 352.*n* is at its smallest.

Figure 4B:
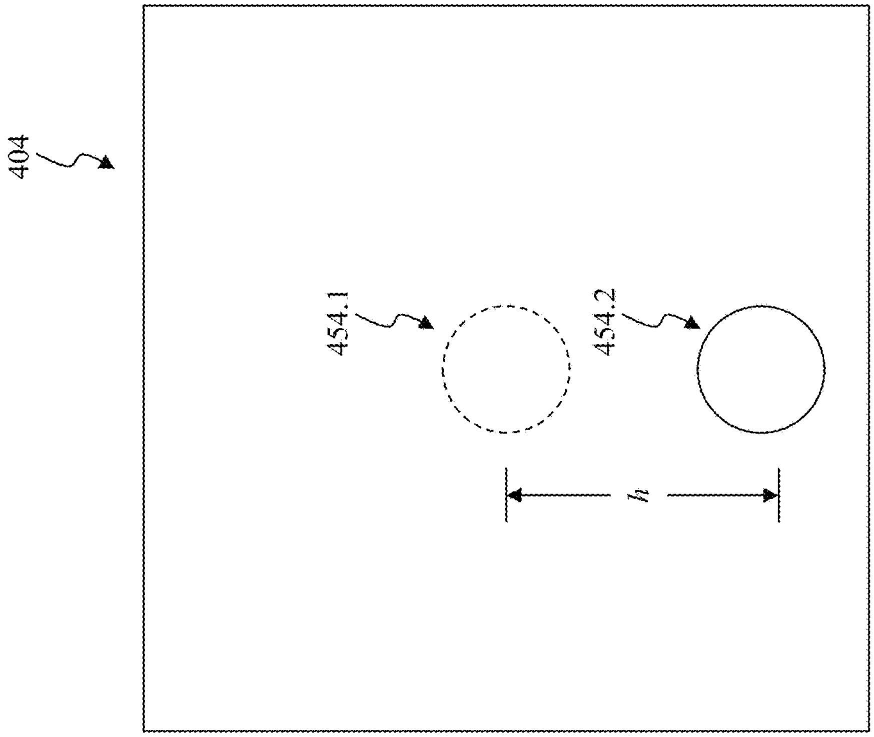
FIG. 4A and FIG. 4B illustrate simplified block diagrams of an exemplary camera lens housing that can be implemented within the exemplary camera system according to some exemplary embodiments of the present disclosure.
Figure 4A:
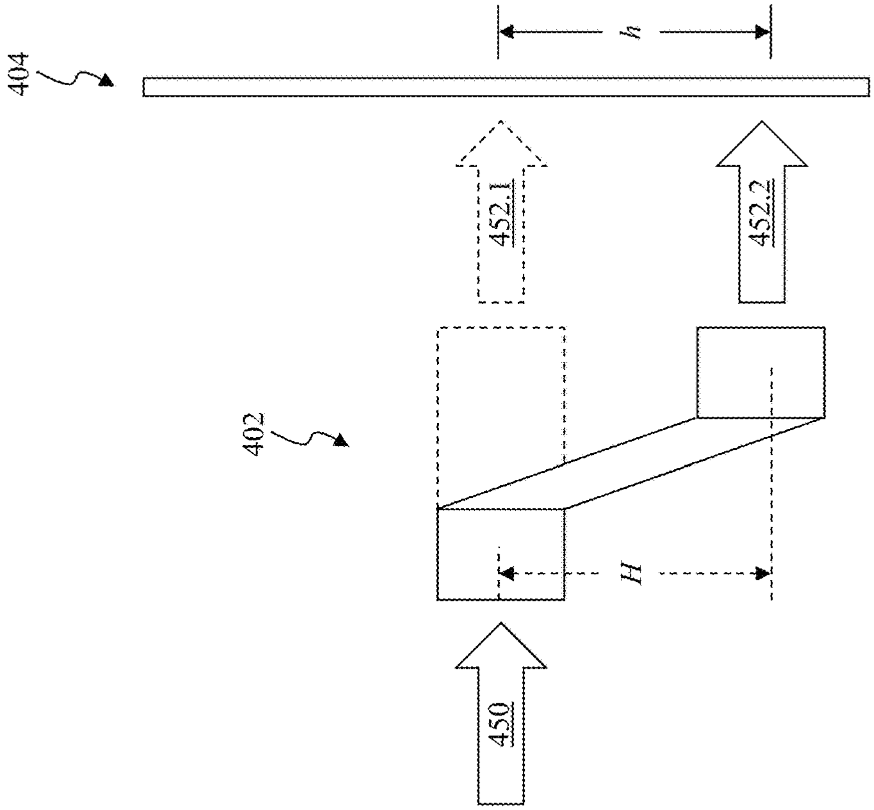

Exemplary Camera Lens Housing that can be Implemented within the Exemplary Camera System FIG. 4A and FIG. 4B illustrate simplified block diagrams of an exemplary camera lens housing that can be implemented within the exemplary camera system according to some exemplary embodiments of the present disclosure. In the exemplary embodiment illustrated in FIG. 4A and FIG. 4B, a camera lens housing 402 projects light onto an image sensor 404. As to be described in further detail below, the camera lens housing 402 can change an orientation or a position of the camera lens housing 402, for example, tilt, shift, and/or rotate, with respect to the image sensor 404. As such, the camera lens housing 402 can steer the orientation or the position of a center of the camera lens housing 402 to focus light that is captured by the camera lens housing 402 toward a periphery, for example, an edge, of the image sensor 404. The camera lens housing 402 and the image sensor 404 can represent exemplary embodiments of the camera lens housing of the camera lens system 204 and the image sensor 212, respectively, as described above in FIG. 2A.

In the exemplary embodiment illustrated in FIG. 4A, the camera lens housing 402 can be implemented to form a perspective-control lens, such as a shift lens or a tilt-shift lens to provide some examples. As illustrated in FIG. 4A, the camera lens housing 402 can capture rays of light 450 that are within its field of view. In some embodiments, the rays of light 450 can be reflected from one or more physical objects within, for example, a scene. After capturing the rays of light 450, the camera lens housing 402 can focus, for example, converge, the rays of light 450 using a simple single lens of transparent material; however, more complicated compound lenses of transparent material, such as doublet lenses, triplet lenses, and/or achromatic lenses, are possible as will be apparent to those skilled in the relevant art(s) without departing from the spirit and scope of the present disclosure. In these embodiments, the transparent material can include glass, crystal, and/or plastic, such as acrylic to provide an example. In some embodiments, these complicated compound lenses can be configured and arranged to form an ultra-wide-angle lens, such as a fisheye lens that produces strong visual distortion intended to create one or more hemispherical images and/or a rectilinear lens with little or no barrel or pincushion distortion that yields one or more images where straight features, such as the edges of walls of buildings, appear with straight lines, as opposed to being curved as with the fisheye lens to provide some examples.

After being focused by the camera lens housing 402, the rays of light 450 can exit the camera lens housing 402 to provide rays of light 452.1 and/or rays of light 452.2 toward the image sensor 404. In some embodiments, the camera lens housing 402 can focus rays of the light 450 that are captured from the one or more images, for example, the scene, to provide the rays of light 452.1 that correspond to the one or more images to the image sensor 404. In some embodiments, the camera lens housing 402 can focus the rays of light 452.1 onto a center of the image sensor 404. As illustrated in FIG. 4B, the center of the camera lens housing 402 can be configured and arranged to be orientated or positioned with respect to the image sensor 404 to project a center 454.1 of the simple single lens and/or the compound lenses of the camera lens housing 402 onto a center of the image sensor 404. In some embodiments, the rays of light 452.1 that are projected onto the image sensor 404 can be reconstructed into the one or more images that can be projected onto a three-dimensional media plane, such as the three-dimensional media plane 102 to provide an example, in a substantially similar manner as described above in FIG. 1A and FIG. 1B. In these embodiments, the one or more images can be projected onto the three-dimensional media plane can be characterized as having its highest optical image quality, for example, resolution, at the top of the three-dimensional media plane, for example, within the conventional prime viewing section 112 as described above.

Alternatively, or in addition to, the camera lens housing 402 can focus rays of the light 450 that are captured from, for example, a scene, to provide the rays of light 452.2 that corresponds to the one or more images to the image sensor 404. In some embodiments, the camera lens housing 402 can focus the rays of light 452.2 toward a periphery, for example, an edge, of the image sensor 404. In these embodiments, the camera lens housing 402 can change the orientation or the position of the camera lens housing 402, for example, tilt, shift, and/or rotate, with respect to the image sensor 404. For example, the camera lens housing 402 can steer the orientation or the position of a center of the camera lens housing 402 with respect to the image sensor 404. In this example, the camera lens housing 402 can steer the orientation or the position of the center of the camera lens housing 402 to direct the rays of light 452.2 toward a periphery, for example, an edge, of the image sensor 404. As illustrated in FIG. 4A, the camera lens housing 402 can steer the orientation or the position of the center of the camera lens housing 402 by a height H to shift the projection of the rays of light 452.2 onto the image sensor 404 by a height h. In some embodiments, a ratio between the height H and the height h is approximately one to one. In these embodiments, the orientation or the position of the center of the camera lens housing 402 can be steered relative to an image circle projected by the camera lens housing 402 in relation to the coverage of the image sensor 404. For example, if the image circle projected by the camera lens housing 402 is ten (10) mm greater than the height of the image sensor 404, then the steering that can be achieved is five (5) mm. In this example, after the five (5) mm, any additional steering of the orientation or the position of the center of the camera lens housing 402 is often not beneficial.

As illustrated in FIG. 4B, a center of the camera lens housing 402 can be configured and arranged to be orientated or positioned with respect to the image sensor 404 to shift a center 454.2 of the simple single lens and/or the compound lenses of the camera lens housing 402 as compared to the center 454.1 by the height h on the image sensor 404. In some embodiments, the rays of light 452.2 that are projected onto the image sensor 404 can be reconstructed into the one or more images that can be projected onto a three-dimensional media plane, such as the three-dimensional media plane 102 to provide an example, in a substantially similar manner as described above in FIG. 1A and FIG. 1B. In these embodiments, the one or more images can be projected onto the three-dimensional media plane can be characterized as having its highest optical image quality, for example, resolution, situated along the interior of the three-dimensional media plane, for example, within the audience prime viewing section 104 as described above in FIGS. 1A and 2B. In some embodiments, the audience prime viewing section 104 as described above in FIGS. 2A and 2B can be characterized as being shifted along the polar angle with respect to the conventional prime viewing section 112 as described above. In these embodiments, an angular difference, or shift, between the conventional prime viewing section 112 and the audience prime viewing section 104 along the polar angle can be represented as:

$$\text{Shift}_\theta = \frac{\text{height } h}{l_{SENSOR}} * fov, \tag{3}$$

wherein $shift_\theta$ represents the angular difference, or shift, between the conventional prime viewing section 112 and the audience prime viewing section 104 along the polar angle θ, height h represents the height h expressed in millimeters (mm) as described above in FIG. 4A and FIG. 4B, $l_{sensor}$ represents a vertical dimension or a horizontal dimension of the image sensor 404 expressed in millimeters (mm) assuming a square image sensor, and fov represents a field of view of the simple single lens and/or the compound lenses of the camera lens housing 402. For example, a shift of fifteen (15) millimeters (mm) between the center of the camera lens housing 402 and the center of the image sensor 404 provides a thirty-two (32) degree shift between the conventional prime viewing section 112 and the audience prime viewing section 104 along the polar angle θ for a square image sensor of 75 millimeters (mm) and a field of view of one hundred sixty (160) degrees for the field of view of the simple single lens and/or the compound lenses of the camera lens housing 402 of the camera lens housing 402.

Exemplary Camera System

Figure 5B:
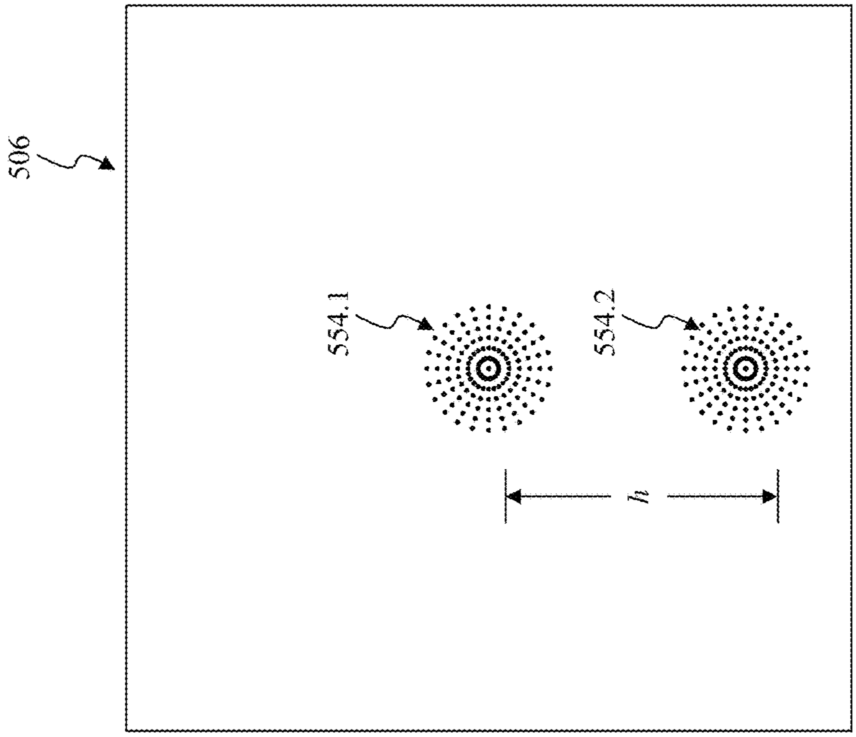
FIG. 5A and FIG. 5B illustrate simplified block diagrams of the exemplary camera system according to some exemplary embodiments of the present disclosure.
Figure 5A:
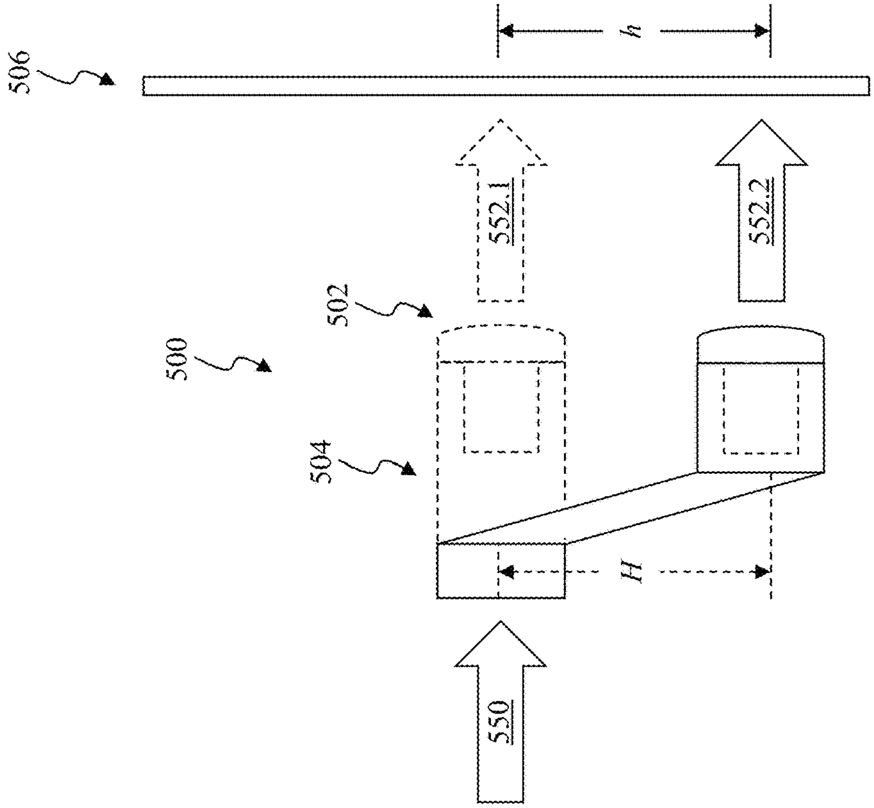

FIG. 5A and FIG. 5B illustrate simplified block diagrams of the exemplary camera system according to some exemplary embodiments of the present disclosure. In the exemplary embodiment illustrated in FIG. 5A, a camera lens system 500 can project light that is captured by the camera lens system 500 onto an image sensor 506. As illustrated in FIG. 5A, the camera lens system 500 can include a camera lens system 502 to direct the light that is captured from, for example, a scene, onto the image sensor 506. The camera lens system 502 can direct the light toward the image sensor 506 to provide a heterogeneous, for example, non-uniform, distribution of the light onto the image sensor 506 in a substantially similar manner as the camera lens system 302 as described above in FIG. 3A and FIG. 3B. As illustrated in FIG. 5A, the camera lens system 500 can include a camera lens housing 504 to direct the light that is captured by the camera lens system 502 onto the image sensor 506. The camera lens housing 504 can change an orientation or a position of the camera lens system 502, for example, tilt, shift, and/or rotate, with respect to the image sensor 506 in a substantially similar manner as the camera lens housing 402 as described above in FIG. 4A and FIG. 4B. The camera lens system 502 can represent an exemplary embodiment of the camera lens system 302 as described above in FIG. 3A and FIG. 3B and/or the camera lens housing 504 can represent an exemplary embodiment of the camera lens housing 402 as described above in FIG. 4A and FIG. 4B.

As illustrated in FIG. 5A, the camera lens system 502 can capture rays of light 550 that are within its field of view in a substantially similar manner as the camera lens system 302 as described above in FIG. 3A and FIG. 3B. After being focused by the camera lens system 502, the rays of light 550 can exit the camera lens system 502 to provide rays of light 552.1 toward the image sensor 506. In the exemplary embodiment illustrated in FIG. 5A, the camera lens system 502 can angularly distribute the rays of light 552.1 heterogeneously, for example, non-uniformly, across the image sensor 506 in a substantially similar manner as the camera lens system 302 as described above in FIG. 3A and FIG. 3B. And as illustrated in FIG. 5B, a center of the camera lens housing 504 can be configured and arranged to be orientated or positioned with respect to the image sensor 506 to project a center 554.1 of the camera lens system 502 onto a center of the image sensor 506 a substantially similar manner as described above in FIG. 4A and FIG. 4B. As further illustrated in FIG. 5B, the camera lens system 502 can angularly distribute the rays of light 552.1 heterogeneously, for example, non-uniformly, about a center of the image sensor 506 in a substantially similar manner as the camera lens system 302 as described above in FIG. 3A and FIG. 3B.

Alternatively, or in addition to, the camera lens housing 504 can focus rays of the light 550 that are captured from, for example, a scene, to provide the rays of light 552.2 that corresponds to the one or more images to the image sensor 506. In the exemplary embodiment illustrated in FIG. 5A, the camera lens housing 504 can change the orientation or the position of the camera lens system 502, for example, tilt, shift, and/or rotate, with respect to the image sensor 506 in a substantially similar manner as the camera lens housing 402 as described above in FIG. 4A and FIG. 4B. For example, the camera lens housing 504 can steer the orientation or the position of a center of the camera lens system 502 with respect to the image sensor 506. In this example, the camera lens housing 504 can steer the orientation or the position of the center of the camera lens system 502 to direct the rays of light 452.2 toward a periphery, for example, an edge, of the image sensor 506 in a substantially similar manner as described above in FIG. 4A and FIG. 4B. As illustrated in FIG. 4B, a center of the camera lens housing 504 can be configured and arranged to be orientated or positioned with respect to the image sensor 506 to shift a center 554.2 of the camera lens system 502 as compared to the center 554.1 by the height h on the image sensor 506 in a substantially similar manner as the camera lens system 402 as described above in FIG. 4A and FIG. 4B. As further illustrated in FIG. 5B, the camera lens system 502 can be specifically manufactured to direct the rays of light 552.2 to be heterogeneously, for example, non-uniformly, distributed onto the image sensor 506 about the periphery of the image sensor 506. In some embodiments, the camera lens system 502 can angularly distribute the rays of light 552.2 heterogeneously, for example, non-uniformly, toward the periphery of the image sensor 506 in a substantially similar manner as described above in FIG. 3A and FIG. 3B. For example, the camera lens system 502 can focus the rays of light 552.2 onto the image sensor 506 to be more concentrated near the periphery of the image sensor 502 as compared to a center of the image sensor 506. In some embodiments, the camera lens system 502 can concentrate the light near the periphery of the image sensor 502 to project more detail for the one or more images, for example, more detail of the scene, near the periphery of the image sensor 502. In these embodiments, the camera lens system 502 can be concentrate the light to be a first density of pixels, for example, seventy (70) pixels per degree (PPD), near the periphery of the image sensor 506 that tapers to a second density of pixels, for example, one hundred forty (140) pixels per degree (PPD), at a center of the image sensor 506. In these embodiments, the pixels of the image sensor 506 can linearly, for example, uniformly, and/or non-linearly, for example, non-uniformly, taper from the first density of pixels to the second density of pixels.

Figure 6:
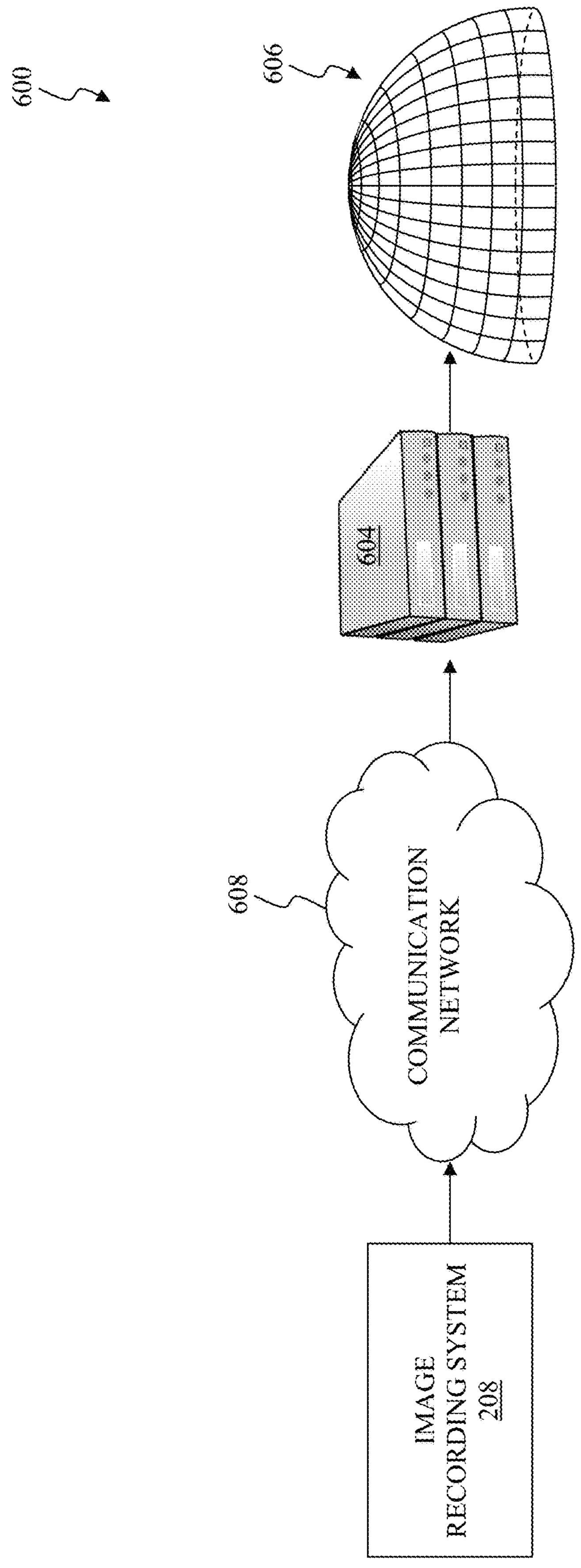
FIG. 6 illustrates a simplified block diagram of an exemplary image projection system according to some exemplary embodiments of the present disclosure.

Exemplary Image Projection System for Projecting the Captured Images onto the Exemplary Venue FIG. 6 illustrates a simplified block diagram of an exemplary image projection system according to some exemplary embodiments of the present disclosure. As described above, an image capture system, such as the image capture system 200 as described above in FIG. 2A, can capture one or more images that can be projected onto a three-dimensional media plane of a venue, such as the three-dimensional media plane 102 of the venue 100 as described above in FIG. 1A and FIG. 1B. In the exemplary embodiment illustrated in FIG. 6, an image projection system 600 can transform the one or more images from two-dimensions to three-dimensions for projection onto the three-dimensional media plane. As to be described in further detail below, the image projection system 600 can utilize a kernel-based sampling technique to project one or more picture elements, also referred to as pixels, of the three-dimensional media plane onto one or more corresponding two-dimensional points on the one or more images. In these embodiments, the kernel-based sampling technique thereafter weights and accumulates color information of one or more pixels from the one or more images that are nearby the one or more corresponding two-dimensional points on the one or more images to interpolate color information, for example, luminance and/or chrominance components of YUV color model and/or red, green, and/or blue components of a RGB color model to provide some examples, of the pixels of the three-dimensional media plane. As illustrated in FIG. 6, the image projection system 600 can include the image recording system 208 that can be communicatively coupled to an image processing server 604 and a venue 606 via a communication network 608. Although the image projection system 600 is illustrated in FIG. 6 as including multiple, discrete devices, those skilled in the relevant art(s) will recognize that one of more of these devices can be combined without departing from the spirit and scope of the present disclosure. For example, the image recording system 208 and the image processing server 604 can be combined into a single discrete device without the communication network 608 as will be apparent to those skilled in the relevant art(s) without departing from the spirit and scope of the present disclosure.

As described above, the image recording system 208 can store the one or more digital image signals and/or the one or more images provided by an image capture system, such as the image capture system 200 as described above in FIG. 2A. As to be described in further detail below in FIG. 6, the one or more digital image signals and/or the one or more images can be further processed by the image processing server 604 for projection onto a three-dimensional media plane, such as a three-dimensional media plane of the venue 606 to provide an example, in a substantially similar manner as described above in FIG. 1A and FIG. 1B.

The image processing server 604 includes one or more computer systems, an exemplary embodiment of which is to be described in further detail below, to retrieve the one or more images stored in the image recording system 208. Alternatively, or in addition to, the image processing server 604 can reconstruct the one or more images from the one or more digital image signals stored in the image recording system 208. In some embodiments, the image processing server 604 can implement one or more digital image processing techniques, also referred to as digital picture processing techniques, to process the one or more digital image signals that are stored in the image recording system 208 to reconstruct the one or more images from the one or more digital image signals. In some embodiments, the one or more digital image processing techniques can include decoding, demosaicing, defective pixel removal, white balancing, noise reduction, color translation, tone reproduction, compression, removal of systematic noise, dark frame subtraction, optical correction, contrast manipulation, unsharp masking, and/or any other suitable well known digital image processing technique that will be apparent to those skilled in the relevant art(s) without departing from the spirit and scope of the present disclosure.

After retrieving the one or more images and/or reconstructing the one or more images from the one or more digital image signals, the image processing server 604 can mathematically transform two-dimensional coordinates of the one or more images into three-dimensional coordinates of the venue 606, which is to be described in further detail below, to enable the one or more images to be projected onto the venue 606. In the exemplary embodiment illustrated in FIG. 6, the image processing server 604 can utilize a kernel-based sampling technique to mathematically transform two-dimensional coordinates of the one or more images into the three-dimensional coordinates of the venue 606. In some embodiments, the kernel-based sampling technique projects the three-dimensional coordinates of the pixels of the venue 606 onto a two-dimensional image space of the one or more images to effectively transform the three-dimensional coordinates of the venue 606 into two-dimensional coordinates of two-dimensional points that are projected onto the one or more images. In these embodiments, the kernel-based sampling technique can covert the three-dimensional coordinates of the venue 606 onto the two-dimensional image space of the one or more images. This conversion can spatially orient the three-dimensional coordinates of the venue 606 with the two-dimensional image space of the one or more images. For example, the kernel-based sampling technique can spatially orient a topside of the venue 606 with a topside of the two-dimensional image space of the one or more images.

After mathematically transform two-dimensional coordinates of the one or more images, the kernel-based sampling technique statistically interpolates color information, for example, luminance and/or chrominance components of YUV color model and/or red, green, and/or blue components of a RGB color model to provide some examples, of the pixels of the venue 606 from the one or more images. In some embodiments, the kernel-based sampling technique can statistically interpolate the color information of the pixels of the venue 606 based upon color information of pixels of the one or more images. In these embodiments, the kernel-based sampling technique can statistically interpolate the color information of the pixels of the venue 606 by weighting and accumulating the color information of the pixels of the one or more images that are nearby the two-dimensional points that are projected on the one or more images.

After interpolating the color information of the pixels of the venue 606, the image processing server 604 can provide the color information to the venue 606 to project the image onto the venue 606. In some embodiments, the image processing server 604 can generate quadruples for the pixels of the venue 606 that include the three-dimensional coordinates of the pixels of the venue 606 and the color information for the pixels of the venue 606 that has been statistically interpolated from the one or more images. In the exemplary embodiment illustrated in FIG. 6, the venue 606 can represent a three-dimensional structure, for example, a hemisphere structure, also referred to as a hemispherical dome. In some embodiments, the hemisphere structure can include one or more visual displays, often referred to as a three-dimensional media plane, that are spread across the interior, or intrados, of the hemisphere structure. In these embodiments, the one or more visual displays can include a series of rows and a series of columns of picture elements, also referred to as pixels, that form a three-dimensional media plane. In these embodiments, the pixels can be implemented using one or more light-emitting diode (LED) displays, one or more organic light-emitting diode (OLED) displays, and/or one or more quantum dots (QDs) displays to provide some examples. For example, the three-dimensional media plane can include a 19,000 by 13,500 LED visual display that wraps around the interior of the three-dimensional structure to form an approximate 160,000 square foot visual display. In some embodiments, the venue 600 can illuminate the pixels of the venue 606 in accordance with the color information to project the one or more images onto the three-dimensional media plane, for example, during the event. In these embodiments, the one or more images can be projected onto the three-dimensional media plane during the event to enhance the visual experience of the audience in viewing the event. In the exemplary embodiment illustrated in FIG. 7, the three-dimensional media plane can include an audience prime viewing section, such as the audience prime viewing section 104 as described above in FIG. 1A and FIG. 1B, having the highest optical image quality that is situated along the interior, or intrados, of the three-dimensional media plane. In some embodiments, the audience prime viewing section can be considered to be a hemisphere structure that is approximately situated at a haunch, which lies approximately halfway between the top and the base, of the three-dimensional media plane in a substantially similar manner as the audience prime viewing section 104 as illustrated in FIG. 1A and FIG. 1B. The audience prime viewing section can be characterized as having the highest optical image quality, for example, resolution, as compared to other viewing sections of the three-dimensional media plane in a substantially similar manner as the audience prime viewing section 104 as illustrated in FIG. 1A and FIG. 1B. In some embodiments, the optical image quality of the one or more images lessens from the highest optical image quality of the audience prime viewing section toward another viewing section that is diametrically opposite to the audience prime viewing section along the interior of the three-dimensional media plane in a substantially similar manner as the audience prime viewing section 104 as illustrated in FIG. 1A and FIG. 1B.

Figure 7:
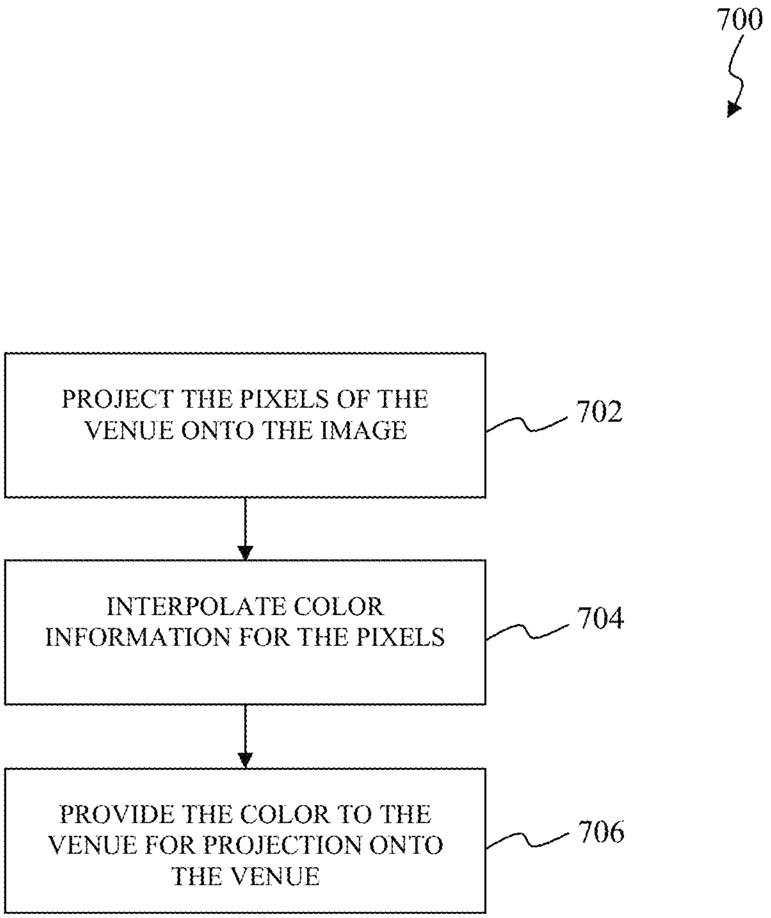
FIG. 7 illustrates a flowchart of an exemplary kernel-based sampling technique that can be implemented within the exemplary projection system according to some exemplary embodiments of the present disclosure.

Exemplary Kernel-Based Sampling Techniques that can be Implemented within the Exemplary Image Projection System FIG. 7 illustrates a flowchart of an exemplary kernel-based sampling technique that can be implemented within the exemplary image projection system according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 700 for mathematically transforming two-dimensional coordinates $(uv.x_1, uv.y_1), (uv.x_2, uv.y_2) \ldots (uv.x_m, uv.y_m)$ of pixels of an image onto three-dimensional coordinates $(pos.x_1, pos.y_1, pos.z_1), (pos.x_2, pos.y_2, pos.z_2) \ldots (pos.x_n, pos.y_n, pos.z_n)$ of a three-dimensional media plane of a three-dimensional venue, such as the venue 100 as described above in FIG. 1A and FIG. 1B, and/or the venue 606 as described above in FIG. 6. For convenience, the two-dimensional coordinates $(uv.x_1, uv.y_1), (uv.x_2, uv.y_2) \ldots (uv.x_m, uv.y_m)$ are to be collectively referred to as two-dimensional coordinates uv.x, uv.y and the three-dimensional coordinates $(pos.x_1, pos.y_1, pos.z_1), (pos.x_2, pos.y_2, pos.z_2) \ldots (pos.x_n, pos.y_n, pos.z_n)$ are to be collectively referred to as three-dimensional coordinates pos.x, pos.y, and pos.z. The operational control flow 700 can be executed by one or more computer systems, such as the image processing server 604 as described above in FIG. 6 to provide an example.

At operation 702, the operational control flow 700 projects the three-dimensional coordinates pos.x, pos.y, and pos.z of the pixels of the three-dimensional media plane onto an image to effectively transform the three-dimensional coordinates pos.x, pos.y, and pos.z of the pixels of the three-dimensional media plane into two-dimensional coordinates $(UV.x_1, UV.y_1), (UV.x_2, UV.y_2) \ldots (UV.x_n, UV.y_n)$ of two-dimensional points that are projected on the image. For convenience, the two-dimensional coordinates $(UV.x_1, UV.y_1), (UVx_2, UV.y_2) \ldots (UV.x_n, UV.y_n)$ of the two-dimensional points that are projected on the image are to be collectively referred to as two-dimensional coordinates UV.x, UV.y.

At operation 704, the operational control flow 700 statistically interpolates color information, for example, luminance and/or chrominance components of YUV color model and/or red, green, and/or blue components of a RGB color model to provide some examples, of the pixels of the three-dimensional media plane from operation 702 from the image. In some embodiments, the operational control flow 700 can statistically interpolate the color information of the pixels of the three-dimensional media plane from operation 702 based upon color information of pixels of the image from operation 702. In these embodiments, the operational control flow 700 can statistically interpolate the color information of the pixels of the three-dimensional media plane from operation 702 by weighting and accumulating the color information of the pixels of the image from operation 702 that are nearby the two-dimensional points that are projected on the image from operation 702. In some embodiments, the weighting can be a distance-based weighting of the color information of the pixels of the image from operation 702 that are nearby the two-dimensional points that are projected on the image from operation 702. For example, the pixels of the image from operation 702 that are closer to the two-dimensional points that are projected on the image from operation 702 are weighted more than the pixels of the image from operation 702 that are further from the two-dimensional points that are projected on the image from operation 702. In some embodiments, if the distance between the two-dimensional points that are projected on the image from operation 702 and the nearby pixels of the image can be considered to be a random variable, the operational control flow 700 can weigh the color information of the nearby pixels of the image in accordance with a probably density function, such as a Gaussian distribution, a Normal Distribution, a Standard Normal Distribution, a Student-t Distribution, a, Chi-Square Distribution, a Continuous Uniform Distribution and/or any other well-known probably density function that will be apparent to those skilled in the relevant art(s) without departing from the spirit and scope of the present disclosure.

At operation 706, the operational control flow 700 provides the color information of the pixels to the venue for projection onto the venue in a substantially similar manner as described above in FIG. 6.

Figure 8:
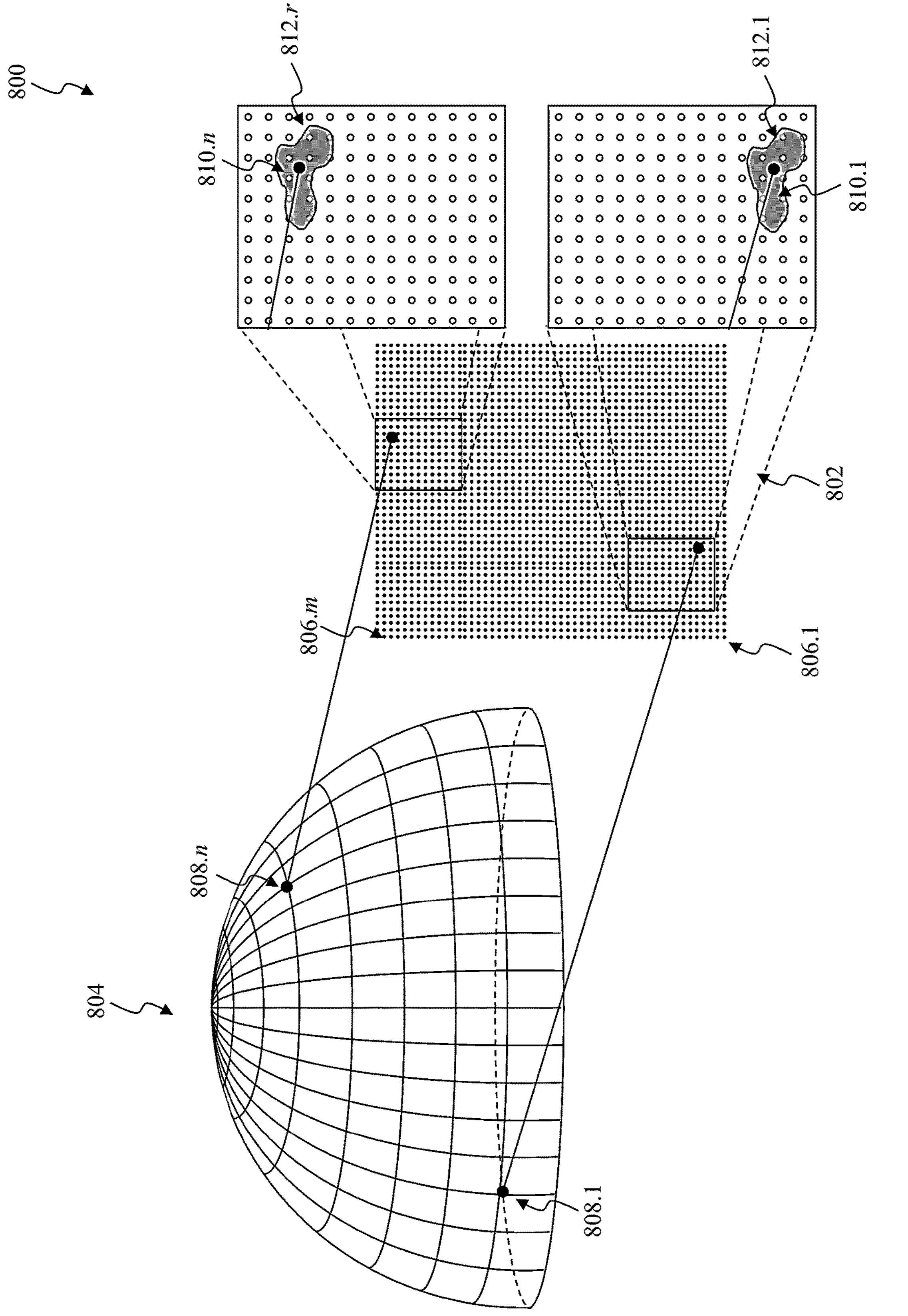
FIG. 8 and FIG. 9 illustrate the exemplary kernel-based sampling techniques that can be implemented within the exemplary projection system according to some exemplary embodiments of the present disclosure.

FIG. 8 illustrates the exemplary kernel-based sampling technique that can be implemented within the exemplary projection system according to some exemplary embodiments of the present disclosure. The discussion of FIG. 8 to follow is to further describe the kernel-based sampling technique as described above in FIG. 6 and/or the operational control flow 700 as described above in FIG. 7. In the exemplary embodiment illustrated in FIG. 8, a kernel-based sampling technique 800 mathematically transforms two-dimensional coordinates of an image 802 onto three-dimensional coordinates of a three-dimensional media plane of a three-dimensional venue 804. The kernel-based sampling technique 800, when executed by one or more computing devices, processors, controllers, or other electrical, mechanical, and/or electro-mechanical devices that will be apparent to those skilled in the relevant art(s), can mathematically transform two-dimensional coordinates of pixels 806.1 through 806.*m* of the image 802 onto three-dimensional coordinates of pixels 808.1 through 808.*n* of the three-dimensional media plane as to be described in further detail below. In some embodiments, the kernel-based sampling technique 800 can represent an exemplary embodiment of the kernel-based sampling technique as described above in FIG. 6 and/or the operational control flow 700 as described above in FIG. 7. And the three-dimensional media plane can represent an exemplary embodiment of the venue 100 as described above in FIG. 1A and FIG. 1B, and/or the three-dimensional media plane as described above in FIG. 6 and/or FIG. 7.

In the exemplary embodiment illustrated in FIG. 8, the kernel-based sampling technique 800 can mathematically transform two-dimensional coordinates ($uv.x_1$, $uv.y_1$), ($uv.x_2$, $uv.y_2$) . . . ($uv.x_m$, $uv.y_m$) of the image 802 into three-dimensional coordinates ($pos.x_1$, $pos.y_1$, $pos.z_1$), ($pos.x_2$, $pos.y_2$, $pos.z_2$) . . . ($pos.x_n$, $pos.y_n$, $pos.z_n$) of the three-dimensional media plane to enable the image 802 to be projected onto the three-dimensional media plane. For convenience, the two-dimensional coordinates ($uv.x_1$, $uv.y_1$), ($uv.x_2$, $uv.y_2$) . . . ($uv.x_m$, $uv.y_m$) are to be collectively referred to as two-dimensional coordinates uv.x, uv.y and the three-dimensional coordinates ($pos.x_1$, $pos.y_1$, $pos.z_1$), ($pos.x_2$, $pos.y_2$, $pos.z_2$) . . . ($pos.x_n$, $pos.y_n$, $pos.z_n$) are to be collectively referred to as three-dimensional coordinates pos.x, pos.y, and pos.z. As illustrated in FIG. 8, the kernel-based sampling technique 800 can project the three-dimensional coordinates pos.x, pos.y, and pos.z of pixels 808.1 through 808.*n* of the three-dimensional media plane onto a two-dimensional space of the image 802 to effectively transform the three-dimensional coordinates pos.x, pos.y, and pos.z of the pixels 808.1 through 808.*n* into two-dimensional coordinates ($UV.x_1$, $UV.y_1$), ($UV.x_2$, $UV.y_2$) . . . ($UV.x_n$, $UV.y_n$) of two-dimensional points 810.1 through 810.*n* that are projected onto the two-dimensional space of the image 802. For convenience, the two-dimensional coordinates ($UV.x_1$, $UV.y_1$), ($UV.x_2$, $UV.y_2$) . . . ($UV.x_n$, $UV.y_n$) that are projected onto the two-dimensional space of the image 802 to be collectively referred to as two-dimensional coordinates UV.x, UV.y that are projected onto the two-dimensional space of the image 802.

After projecting the three-dimensional coordinates pos.x, pos.y, and pos.z of the pixels 808.1 through 808.*n* of the three-dimensional media plane, the kernel-based sampling technique 800 statistically interpolates color information for example, luminance and/or chrominance components of YUV color model and/or red, green, and/or blue components of a RGB color model to provide some examples, of the pixels 808.1 through 808.*n* from the image 802. In some embodiments, the kernel-based sampling technique 800 can statistically interpolate the color information of the pixels 808.1 through 808.*n* based upon color information of the pixels 806.1 through 806.*m*. In these embodiments, the kernel-based sampling technique 800 can statistically interpolate the color information of the pixels 808.1 through 808.*n* by weighting and accumulating the color information of the pixels 806.1 through 806.*m* that are nearby the two-dimensional points 810.1 through 810.*n*.

As illustrated in FIG. 8, the kernel-based sampling technique 800 can weigh the color information of the pixels 806.1 through 806.*m* that are nearby the two-dimensional points 810.1 through 810.*n*. In some embodiments, the kernel-based sampling technique 800 can identify the pixels 806.1 through 806.*m* that are nearby the two-dimensional points 810.1 through 810.*n*. In these embodiments, the pixels 806.1 through 806.*m* that are nearby the two-dimensional points 810.1 through 810.*n* can be situated within regions of interest (ROIs), also referred to as sampling kernel spaces 812.1 through 812.*r*, of the image 802. Generally, the sampling kernel spaces 812.1 through 812.*r* can be arbitrary geometric regions within the two-dimensional space of the image 802 that include one or more pixels from among the pixels 806.1 through 806.*m* that will be apparent to those skilled in the relevant art(s) without departing from the spirit and scope of the present disclosure. In some embodiments, the arbitrary geometric regions can include closed geometric regions, such as regular curves; such as circles or ellipses, irregular curves; regular polygons, such as equilateral triangles or squares, and/or irregular polygons, such as rectangles and/or parallelograms to provide some examples. Alternatively, or in addition to, the arbitrary geometric regions can be related to one or more mathematical functions such as an Ackley function, a Himmelblau function, a Rastrigin function, a Rosenbrock function, also known as Rosenbrock's banana function, and/or a Shekel function to provide some examples. In some embodiments, the sampling kernel spaces 812.1 through 812.*r* can be substantially similar to one another. Alternatively, some of the sampling kernel spaces 812.1 through 812.*r* can differ from one another. For example, the kernel-based sampling technique 800 can utilize the one or more mathematical functions, such as the Rosenbrock function to provide an example, as the arbitrary geometric region for a first sampling kernel space from among the sampling kernel spaces 812.1 through 812.*r* and a regular curve, such as a circle to provide an example, as the arbitrary geometric region for a second sampling kernel space from among the sampling kernel spaces 812.1 through 812.*r*. In some embodiments, the arbitrary geometric regions can be related to the three-dimensional coordinates pos.x, pos.y, and pos.z of the pixels 808.1 through 808.*n* of the three-dimensional media plane. In these embodiments, the kernel-based sampling technique 800 can utilize a first arbitrary geometric region for a first sampling kernel space when the three-dimensional coordinates pos.x, pos.y, and pos.z for it corresponding pixel from among the is near a top, or a crown, of the three-dimensional media plane and/or a second arbitrary geometric region for a second sampling kernel space when the three-dimensional coordinates pos.x, pos.y, and pos.z for it corresponding pixel from among the is near a bottom, or a springing, of the three-dimensional media plane.

After identifying the pixels 806.1 through 806.*m* within the sampling kernel spaces 812.1 through 812.*r*, the kernel-based sampling technique 800 can weigh the color information, for example, luminance and/or chrominance components of YUV color model and/or red, green, and/or blue components of a RGB color model to provide some examples, of these pixels. In some embodiments, the weighting can be a distance-based weighting of the color information of the pixels 806.1 through 806.*m* within the sampling kernel spaces 812.1 through 812.*r*. For example, the pixels 806.1 through 806.*m* within the sampling kernel spaces 812.1 through 812.*r* that are closer to the two-dimensional points 810.1 through 810.*n* are weighted more than the pixels 806.1 through 806.*m* within the sampling kernel spaces 812.1 through 812.*r* that are further from the two-dimensional points 810.1 through 810.*n*. In some embodiments, if the distances between the pixels 806.1 through 806.*m* within the sampling kernel spaces 812.1 through 812.*r* and the two-dimensional points 810.1 through 810.*n* can be considered to be a random variable, the kernel-based sampling technique 800 can weigh the color information of the pixels 806.1 through 806.*m* within the sampling kernel spaces 812.1 through 812.*r* in accordance with a probably density function, such as a Gaussian distribution, a Normal Distribution, a Standard Normal Distribution, a Student-t Distribution, a, Chi-Square Distribution, a Continuous Uniform Distribution and/or any other well-known probably density function that will be apparent to those skilled in the relevant art(s) without departing from the spirit and scope of the present disclosure.

Once the color information of the pixels 806.1 through 806.*m* within the sampling kernel spaces 812.1 through 812.*r* has been weighted, the kernel-based sampling technique 800 can accumulate the weighted color information of these pixels to statistically interpolate the color information of the pixels 808.1 through 808.*n*. In the exemplary embodiment illustrated in FIG. 8, the kernel-based sampling technique 800 can accumulate the color information of the pixels 806.1 through 806.*m* within the sampling kernel spaces 812.1 through 812.*r* that has been weighted as described above to statistically interpolate the color information of the two-dimensional points 810.1 through 810.*n*. In these embodiments, the kernel-based sampling technique 800 can associate the two-dimensional points 810.1 through 810.*n* that are projected onto the two-dimensional space of the image 802 with their corresponding pixels from among the pixels 808.1 through 808.*n* of the three-dimensional media plane. Thereafter, the kernel-based sampling technique 800 can associate the color information of the two-dimensional points 810.1 through 810.*n* to their corresponding pixels from among the pixels 808.1 through 808.*n* to statistically interpolate the color information of the pixels 808.1 through 808.*n*. In some embodiments, the kernel-based sampling technique 800 can generate quadruples for the pixels 808.1 through 808.*n* that include the three-dimensional coordinates pos.x, pos.y, and pos.z of the pixels 808.1 through 808.*n* and the color information for the pixels 808.1 through 808.*n* that has been statistically interpolated from the image 802.

Figure 9:
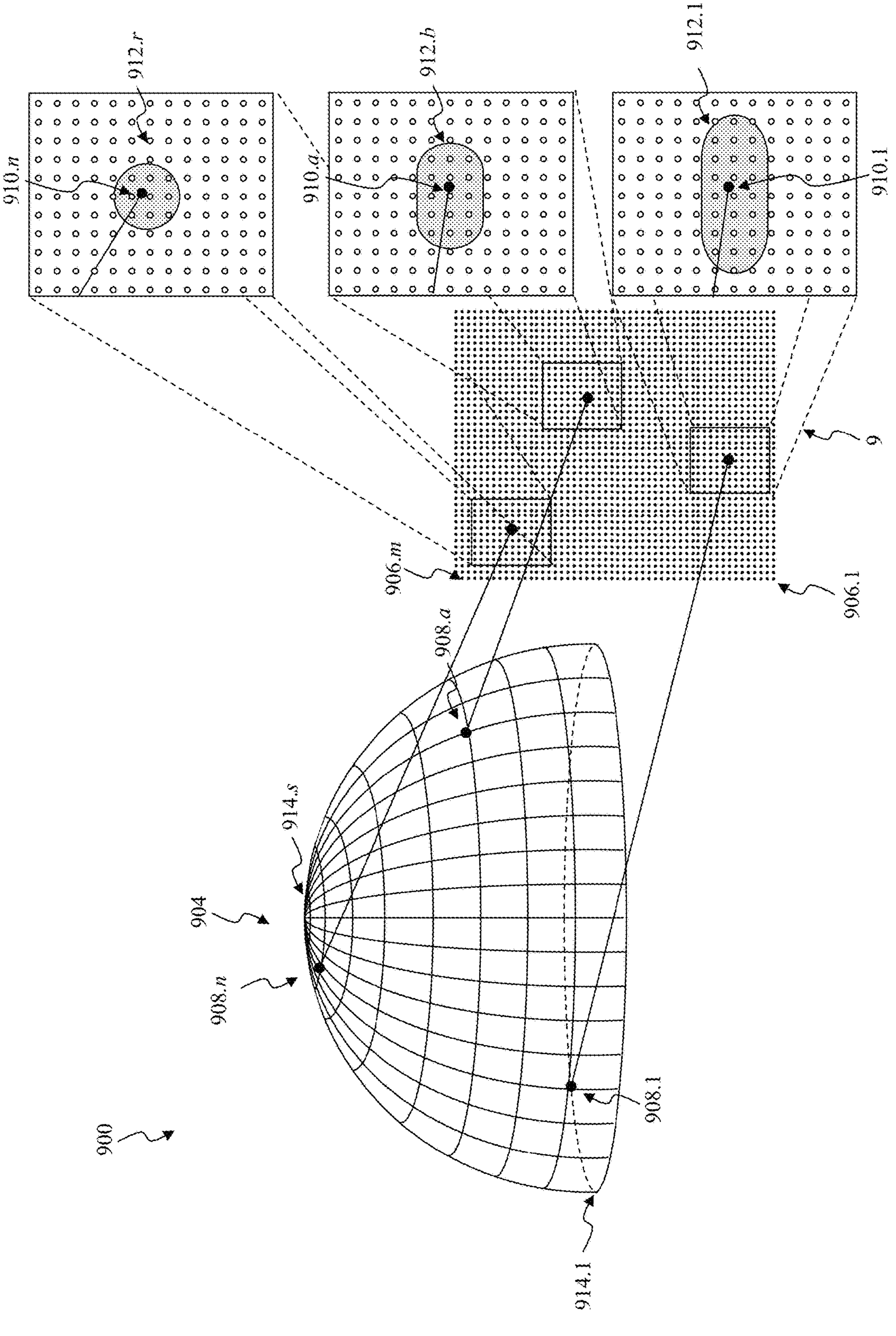

FIG. 9 illustrates the exemplary kernel-based sampling technique that can be implemented within the exemplary projection system according to some exemplary embodiments of the present disclosure. The discussion of FIG. 9 to follow is to further describe an exemplary embodiment for the sampling kernel spaces of the kernel-based sampling technique 800 as described above in FIG. 8. In the exemplary embodiment illustrated in FIG. 9, a kernel-based sampling technique 900 mathematically transforms two-dimensional coordinates of an image 902 onto three-dimensional coordinates of a three-dimensional media plane of a three-dimensional venue 904. The kernel-based sampling technique 900, when executed by one or more computing devices, processors, controllers, or other electrical, mechanical, and/or electro-mechanical devices that will be apparent to those skilled in the relevant art(s), can mathematically transform two-dimensional coordinates of pixels 906.1 through 906.*m* of the image 902 onto three-dimensional coordinates of pixels 908.1 through 908.*n* of the three-dimensional media plane as to be described in further detail below. In some embodiments, the kernel-based sampling technique 900 can represent an exemplary embodiment of the kernel-based sampling technique 800 as described above in FIG. 8. As such, the kernel-based sampling technique 900 as to be described in further detail below shares many substantially similar features with the kernel-based sampling technique 800 as described above in FIG. 8; therefore, only differences between the kernel-based sampling technique 800 and the kernel-based sampling technique 900 are to be described in further detail below.

As illustrated in FIG. 9, the kernel-based sampling technique 900 can project the three-dimensional coordinates pos.x, pos.y, and pos.z of pixels 908.1 through 908.*n* of the three-dimensional media plane onto a two-dimensional space of the image 902 to effectively transform the three-dimensional coordinates pos.x, pos.y, and pos.z of the pixels 908.1 through 908.*n* into two-dimensional coordinates uv.x, uv. of two-dimensional points 910.1 through 910.*n* that are projected onto the two-dimensional space of the image 902 in a substantially similar manner as the kernel-based sampling technique 800 as described above in FIG. 8.

After projecting the three-dimensional coordinates pos.x, pos.y, and pos.z of the pixels 908.1 through 908.*n*, the kernel-based sampling technique 900 statistically interpolates color information for example, luminance and/or chrominance components of YUV color model and/or red, green, and/or blue components of a RGB color model to provide some examples, of the three-dimensional media plane from the image 902 in a substantially similar manner as the kernel-based sampling technique 800 as described above in FIG. 8. However, as illustrated in FIG. 9, the pixels 906.1 through 906.*m* that are nearby the two-dimensional points 910.1 through 910.*n* can be situated within regions of interest (ROIs), also referred to as sampling kernel spaces, 912.1 through 912.*r* of the image 902. As illustrated in FIG. 9, a two-dimensional point 910.1 that corresponds to the pixel 908.1 can be situated within a sampling kernel space 912.1, a two-dimensional point 910.*a* that corresponds to the pixel 908.*a* can be situated within a sampling kernel space 912.*b*, and/or a two-dimensional point 910.*n* that corresponds to the pixel 908.*n* can be situated within a sampling kernel space 912.*n*.

In the exemplary embodiment illustrated in FIG. 9, two-dimensional areas of the sampling kernel spaces 912.1 through 912.*r* can be related to distances between the pixels 908.1 through 908.*n* of the three-dimensional media plane. As illustrated in FIG. 9, the pixels 908.1 through 908.*n* can be situated along circles or slices 914.1 through 914.*s* of the three-dimensional media plane. In some embodiments, the vertical distance between adjacent slices from among the slices 914.1 through 914.*s* is approximately the same from the top of the three-dimensional media plane to the bottom of the three-dimensional media plane. However, the radial distance between adjacent pixels from among the same slice from among the slices 914.1 through 914.*s* increases from the top of the three-dimensional media plane to the bottom of the three-dimensional media plane. As such, in some embodiments, the two-dimensional areas of the sampling kernel spaces 912.1 through 912.*r* increase from a top, or a crown, of the three-dimensional media plane toward a bottom, or a springing, of the three-dimensional media plane. In these embodiments, the two-dimensional areas of the sampling kernel spaces 912.1 through 912.*r* are at their minimum areas at the top of the three-dimensional media plane and their maximum areas at the bottom of the three-dimensional media plane. For example, the horizontal distances of the sampling kernel spaces 912.1 through 912.*r* increase while the vertical distances of the sampling kernel spaces 912.1 through 912.*r* remain approximately the same from the top of the three-dimensional media plane toward the bottom of the three-dimensional media plane.

After identifying the pixels 906.1 through 906.*m* within the sampling kernel spaces 912.1 through 912.*r*, the kernel-based sampling technique 900 can weigh the color information, for example, luminance and/or chrominance components of YUV color model and/or red, green, and/or blue components of a RGB color model to provide some examples, of these pixels in a substantially similar manner as the kernel-based sampling technique 800 as described above in FIG. 8. And once the color information of the pixels 906.1 through 906.*m* within the sampling kernel spaces 912.1 through 912.*r* has been weighted, the kernel-based sampling technique 900 can accumulate the weighted color information of these pixels to statistically interpolate the color information of the pixels 908.1 through 908.*n* in a substantially similar manner as the kernel-based sampling technique 800 as described above in FIG. 8.

Figure 10:
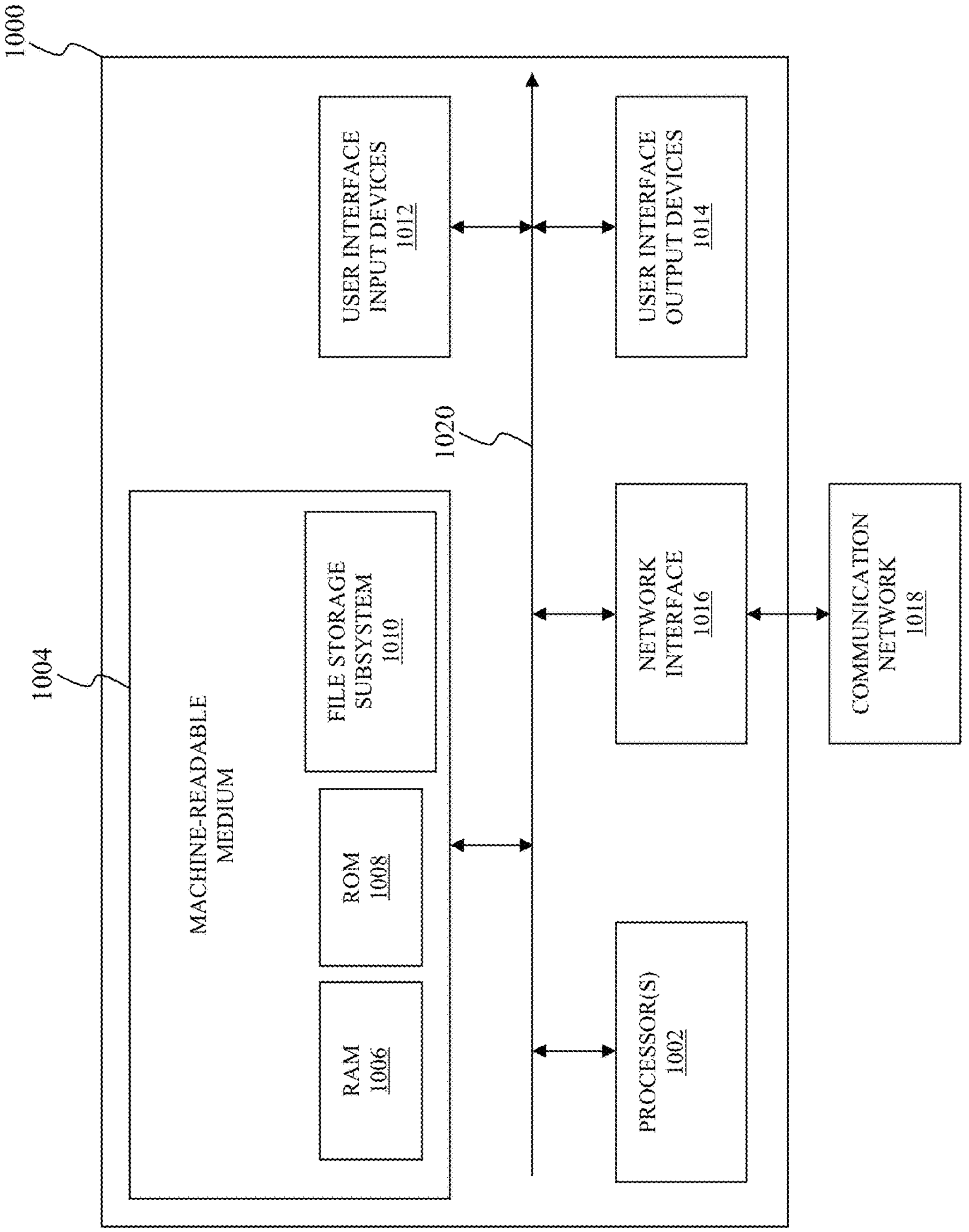
FIG. 10 illustrates a simplified block diagram of an exemplary computer system that can be implemented within the exemplary image capture system and/or the exemplary image projection system according to some exemplary embodiments of the present disclosure.

Exemplary Computer System that can be Implemented within the Exemplary Image Capture System and/or the Exemplary Image Projection System FIG. 10 illustrates a simplified block diagram of an exemplary computer system that can be implemented within the exemplary image capture system and/or the exemplary image projection system according to some exemplary embodiments of the present disclosure. The discussion of FIG. 10 to follow is to describe a computer system 1000 that can be implemented within the exemplary image capture system as described above in FIG. 2A and/or the exemplary image projection system as described above in FIG. 6.

In the exemplary embodiment illustrated in FIG. 10, the computer system 1000 includes one or more processors 1002. In some embodiments, the one or more processors 1002 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).) In some embodiments, the computer system 1000 can include an operating system, such as Microsoft's Windows, Sun Microsystems's Solaris, Apple Computer's MacOs, Linux or UNIX. In some embodiments, the computer system 1000 can also include a Basic Input/Output System (BIOS) and processor firmware. The operating system, BIOS and firmware are used by the one or more processors 1002 to control subsystems and interfaces coupled to the one or more processors 1002. In some embodiments, the one or more processors 1002 can include the Pentium and Itanium from Intel, the Opteron and Athlon from Advanced Micro Devices, and the ARM processor from ARM Holdings.

As illustrated in FIG. 10, the computer system 1000 can include a machine-readable medium 1004. In some embodiments, the machine-readable medium 1004 can further include a main random-access memory ("RAM") 1006, a read only memory ("ROM") 1008, and/or a file storage subsystem 1010. The RAM 1030 can store instructions and data during program execution and the ROM 1032 can store fixed instructions. The file storage subsystem 1010 provides persistent storage for program and data files, and may include a hard disk drive, a floppy disk drive along with associated removable media, a CD-ROM drive, an optical drive, a flash memory, or removable media cartridges.

The computer system 1000 can further include user interface input devices 1012 and user interface output devices 1014. The user interface input devices 1012 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 1012 can be connected by wire or wirelessly to the computer system 1000. Generally, the user interface input devices 1012 are intended to include all possible types of devices and ways to input information into the computer system 1000. The user interface input devices 1012 typically allow a user to identify objects, icons, text and the like that appear on some types of user interface output devices, for example, a display subsystem. The user interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. Generally, the user interface output devices 1020 are intended to include all possible types of devices and ways to output information from the computer system 1000. The computer system 1000 can further include a network interface 1016 to provide an interface to outside networks, including an interface to a communication network 1018, and is coupled via the communication network 1018 to corresponding interface devices in other computer systems or machines. The communication network 1018 may comprise many interconnected computer systems, machines and communication links. These communication links may be wired links, optical links, wireless links, or any other devices for communication of information. The communication network 1018 can be any suitable computer network, for example a wide area network such as the Internet, and/or a local area network such as Ethernet. The communication network 1018 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 10, the one or more processors 1002, the machine-readable medium 1004, the user interface input devices 1012, the user interface output devices 1014, and/or the network interface 1016 can be communicatively coupled to one another using a bus subsystem 1020. Although the bus subsystem 1020 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An image capture system, comprising:

a camera assembly including an image sensor defining an active sensing area having a center and a periphery;

a camera lens system, mounted relative to the image sensor, comprising:

an ultra-wide-angle camera lens comprising a plurality of asymmetrically configured optical lens elements arranged to produce a non-uniform angular distribution of light across an image circle, the non-uniform angular distribution being defined by configuration of the plurality of asymmetrically configured optical lens elements and including rays having differing angular densities across the image circle, the image circle having a radius greater than a radius of the active sensing area of the image sensor, and a perspective-control mounting mechanism configured to steer an optical axis of the ultra-wide-angle camera lens relative to a center of the image sensor to position the image circle with respect to the active sensing area of the image sensor, independent of the non-uniform angular distribution produced by the plurality of asymmetrically configured optical lens elements, wherein the non-uniform angular distribution of the light is produced by the plurality of asymmetrically configured optical lens elements and includes a first portion of the image circle having a higher ray density and a second portion of the image circle having a lower ray density, and wherein the perspective-control mounting mechanism is further configured to position the first portion and the second portion relative to the active sensing area of the image sensor such that the higher ray density is directed toward the periphery of the active sensing area and the lower ray density is directed toward the center of the active sensing area; and an image recording system configured to receive and store a digital image signal generated by the image sensor.

2. The image capture system of claim 1, wherein the higher ray density is positioned at a location corresponding to a midpoint between a top portion and a bottom portion of the image sensor.

3. The image capture system of claim 1, wherein the ultra-wide-angle camera lens has a field of view between approximately one hundred (100) and approximately one-hundred eighty (180) degrees.

4. The image capture system of claim 1, wherein the ultra-wide-angle camera lens is configured to tilt, shift, or rotate a center of the ultra-wide-angle camera lens with respect to the image sensor.

5. The image capture system of claim 1, wherein the camera lens system is configured to focus a higher concentration of the light near the periphery of the image sensor onto a first density of pixels of the image sensor at the periphery of the image sensor, wherein the camera lens system is configured to focus a lower concentration of the light near the center of the image sensor onto a second density of pixels of the image sensor, less than the first density of pixels, at the center of the image sensor, and wherein the first density of pixels non-uniformly tapers to the second density of pixels.

6. The image capture system of claim 1, wherein the image sensor comprises a color sensor that includes a color mask that is configured to absorb undesired color wavelengths so that each pixel of the image sensor is sensitive to a specific color wavelength.

7. The image capture system of claim 1, wherein the image recording system is configured to store the digital image signal as a raw camera image file having radiometric characteristics of the light captured by the image capture system.

8. The image capture system of claim 1, wherein the image capture system is coupled to an image processing server, the image processing server being configured to process the digital image signal for projection onto a three-dimensional media plane in accordance with three-dimensional coordinates of a three-dimensional media plane and color information for the three-dimensional coordinates.

9. The image capture system of claim 8, wherein the image processing server is configured to:

retrieve an image from the digital image signal;

mathematically transform two-dimensional coordinates of the image into the three-dimensional coordinates of the three-dimensional media plane; and interpolate the color information for the three-dimensional coordinates from the image.

10. The image capture system of claim 1, wherein the plurality of asymmetrically configured optical lens elements comprises a compound lens including a doublet, triplet, or achromatic configuration, configured to produce the non-uniform angular distribution of the light across the image circle.

11. The image capture system of claim 1, wherein the plurality of asymmetrically configured optical lens elements is configured to provide a first set of rays with a lower concentration of the light focused near the center of the image sensor and a second set of rays with a higher concentration of the light focused near a periphery of the image sensor.

12. The image capture system of claim 11, wherein the perspective-control mounting mechanism is configured to orient the optical axis relative to the image sensor to shift the image circle to position the second set of rays at the periphery of the image sensor.

13. The image capture system of claim 1, wherein the plurality of asymmetrically configured optical lens elements comprises one or more curved lens elements, curvature of the one or more curved lens elements configured to focus a higher concentration of the light near a periphery of the image sensor and a lower concentration of the light near the center of the image sensor.

14. The image capture system of claim 1, wherein the plurality of asymmetrically configured optical lens elements is arranged in a fish-eye lens configured to produce the non-uniform angular distribution of the light such that a higher angular density of rays is directed toward a periphery of the image sensor and a lower angular density is directed toward the center of the image sensor.

15. The image capture system of claim 14, wherein the fish-eye lens comprises one or more curved lens elements, curvature of the one or more curved lens elements being asymmetrically configured to produce the non-uniform angular distribution of the light across the image circle.

16. A camera lens system, comprising:

a perspective-control mounting mechanism configured to steer an optical axis of the camera lens system relative to an image sensor to position an image circle of the camera lens system with respect to an active sensing area of the image sensor, independent of a non-uniform angular distribution produced by the camera lens system; and an ultra-wide-angle camera lens comprising a plurality of asymmetrically configured optical lens elements arranged to produce the non-uniform angular distribution of light across the image circle, the non-uniform angular distribution being defined by configuration of the plurality of asymmetrically configured optical lens elements and including rays having differing angular densities across the image circle, wherein the non-uniform angular distribution includes a first portion of the image circle having a higher ray density and a second portion of the image circle having a lower ray density, and wherein the perspective-control mounting mechanism is configured to position the first portion and the second portion relative to the image sensor such that the higher ray density is directed toward a periphery of the image sensor and the lower ray density is directed toward a center of the image sensor.

17. The camera lens system of claim 16, wherein the non-uniform angular distribution is configured such that the higher ray density is positioned at a location corresponding to a midpoint between a top portion and a bottom portion of the image sensor.

18. The camera lens system of claim 16, wherein the ultra-wide-angle camera lens has a field of view between approximately one hundred (100) and approximately one-hundred eighty (180) degrees.

19. The camera lens system of claim 18, wherein the plurality of asymmetrically configured optical lens elements is arranged in a fisheye lens configuration.

20. The camera lens system of claim 16, wherein the perspective-control mounting mechanism is configured to tilt, shift, or rotate a center of the camera lens system with respect to the image sensor.

21. The camera lens system of claim 16, wherein the plurality of asymmetrically configured optical lens elements is configured to direct a first portion of the non-uniform angular distribution having a higher ray density toward the periphery of the image sensor and a second portion of the non-uniform angular distribution having a lower ray density toward a center of the image sensor, wherein the higher ray density corresponds to a first density of pixels at the periphery of the image sensor, and wherein the lower ray density corresponds to a second density of pixels at the center of the image sensor, the second density of pixels being less than the first density of pixels.

22. An image capture system, comprising:

a camera lens system comprising:

a perspective-control mounting mechanism configured to steer an optical axis of the camera lens system relative to an image sensor to position an image circle of the camera lens system with respect to an active sensing area of the image sensor, independent of a non-uniform angular distribution produced by the camera lens system, and an ultra-wide-angle camera lens comprising a plurality of asymmetrically configured optical lens elements arranged to produce the non-uniform angular distribution of light across the image circle, the non-uniform angular distribution being defined by configuration of the plurality of asymmetrically configured optical lens elements and including rays having differing angular densities across the image circle, wherein the non-uniform angular distribution includes a first portion of the image circle having a higher ray density and a second portion of the image circle having a lower ray density, and wherein the perspective-control mounting mechanism is configured to position the first portion and the second portion relative to the image sensor such that the higher ray density is directed toward a periphery of the image sensor and the lower ray density is directed toward a center of the image sensor; and a camera assembly, including the image sensor, configured to capture the light received from the camera lens system to generate a digital image signal.

23. The image capture system of claim 22, wherein the non-uniform angular distribution is configured such that the higher ray density is positioned at a location corresponding to a midpoint between a top portion and a bottom portion of the image sensor.

24. The image capture system of claim 22, wherein the ultra-wide-angle camera lens has a field of view between approximately one hundred (100) and approximately one-hundred eighty (180) degrees.

25. The image capture system of claim 22, wherein the perspective-control mounting mechanism is configured to tilt, shift, or rotate a center of the camera lens system with respect to the image sensor.

26. The image capture system of claim 22, wherein the image sensor comprises a color sensor that includes a color mask that is configured to absorb undesired color wavelengths so that each pixel of the image sensor is sensitive to a specific color wavelength.

27. The image capture system of claim 22, further comprising an image recording system configured to store the digital image signal as a raw camera image file having radiometric characteristics of the light captured by the image capture system.

28. The image capture system of claim 22, wherein the plurality of asymmetrically configured optical lens elements is configured to direct a first portion of the non-uniform angular distribution having a higher ray density toward a periphery of the image sensor and a second portion of the non-uniform angular distribution having a lower ray density toward a center of the image sensor, wherein the higher ray density corresponds to a first density of pixels at the periphery of the image sensor, and wherein the lower ray density corresponds to a second density of pixels at the center of the image sensor, the second density of pixels being less than the first density of pixels.

* * * * *